United States Patent

Aoki

(10) Patent No.: US 10,539,785 B2
(45) Date of Patent: Jan. 21, 2020

(54) OPTICAL SYSTEM AND IMAGE PICKUP APPARATUS INCLUDING THE SAME

(71) Applicant: CANON KABUSHIKI KAISHA, Tokyo (JP)

(72) Inventor: Koji Aoki, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/342,682

(22) Filed: Nov. 3, 2016

(65) Prior Publication Data

US 2017/0131527 A1  May 11, 2017

(30) Foreign Application Priority Data

Nov. 10, 2015  (JP) .................... 2015-220758

(51) Int. Cl.
    G02B 27/00  (2006.01)
(52) U.S. Cl.
    CPC ................. *G02B 27/0025* (2013.01)
(58) Field of Classification Search
    CPC .... G02B 13/006; G02B 13/009; G02B 15/00; G02B 15/02; G02B 15/10; G02B 15/14; G02B 15/177; G02B 15/22; G02B 27/0025; G02B 27/646; H04N 5/2254
    USPC ....... 359/227, 354, 362, 432, 462, 468, 557, 359/642, 670, 672, 676, 680, 682–686, 359/694–698, 738–740, 745–746, 753, 359/823, 894; 396/72; 348/207.99, 348/240.3, 345, 358, 561
    See application file for complete search history.

(56) References Cited

U.S. PATENT DOCUMENTS

| 2005/0122595 A1* | 6/2005 | Nurishi ................. G02B 15/17 359/684 |
| 2014/0152887 A1 | 6/2014 | Hagiwara |

FOREIGN PATENT DOCUMENTS

| CN | 102346292 A | 2/2012 |
| CN | 103649808 A | 3/2014 |
| CN | 103782217 A | 5/2014 |
| EP | 1530071 A2 | 5/2005 |
| JP | S52-018139 Y | 4/1977 |
| JP | 52-138922 A | 11/1977 |
| JP | S52-143043 A | 11/1977 |
| JP | S59-084212 A | 5/1984 |
| JP | 63-205627 A | 8/1988 |

\* cited by examiner

*Primary Examiner* — Thomas K Pham
*Assistant Examiner* — Ibrahima Diedhiou
(74) *Attorney, Agent, or Firm* — Canon USA, Inc. IP Division

(57) ABSTRACT

An optical system includes an aperture stop, and an optical member that is removably insertable in an optical path defined by an object side and an image side of the optical system, the optical member is disposed on the image side of the aperture stop. In a first focus range between infinity and a first finite distance, the optical member is removed from the optical path. In a second focus range between a second finite distance shorter than the first finite distance and a third finite distance shorter than the second finite distance, the optical member is inserted in the optical path. The thickness of the optical member on the optical axis and the focal length of the optical member are suitably determined.

10 Claims, 18 Drawing Sheets

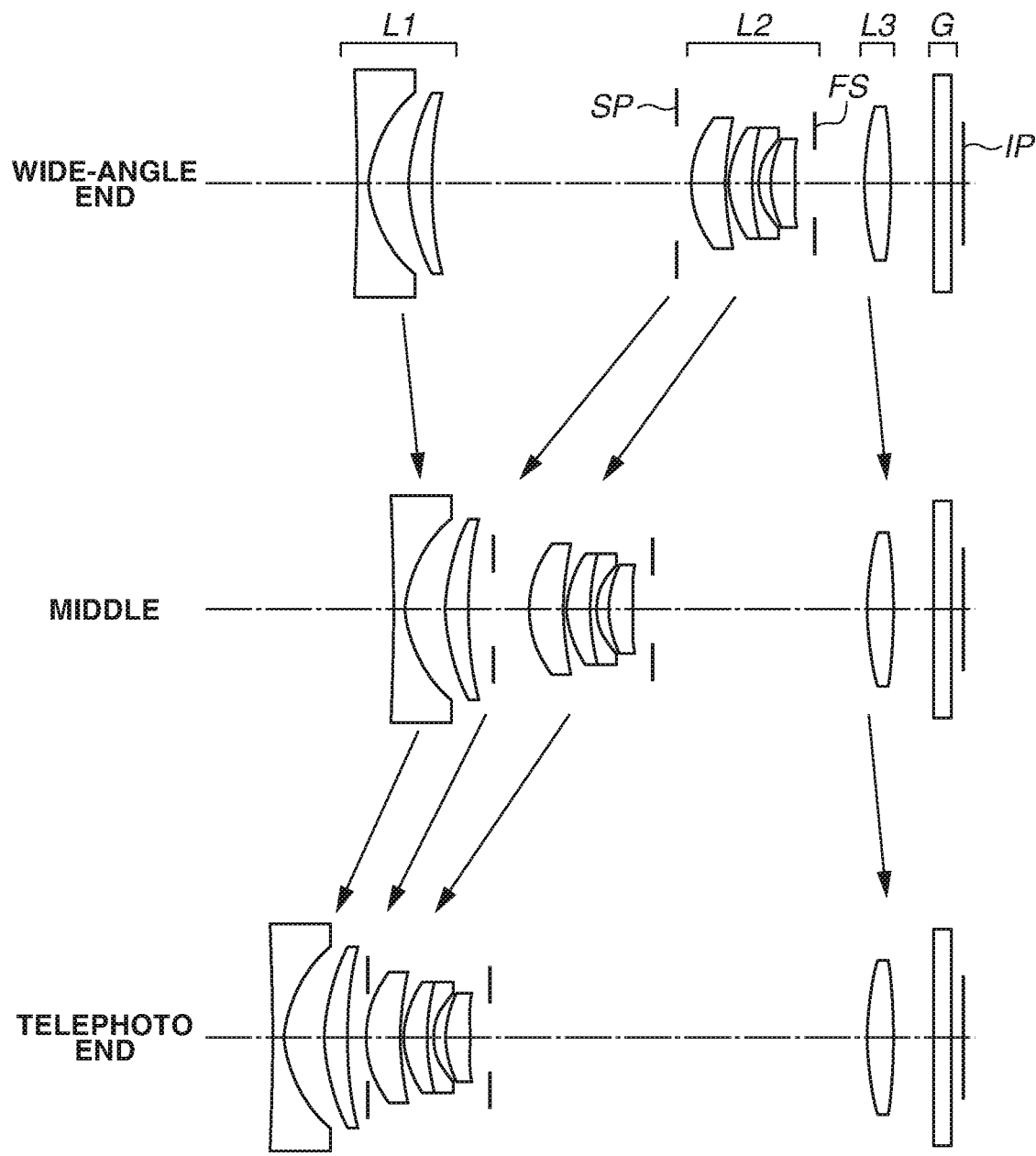

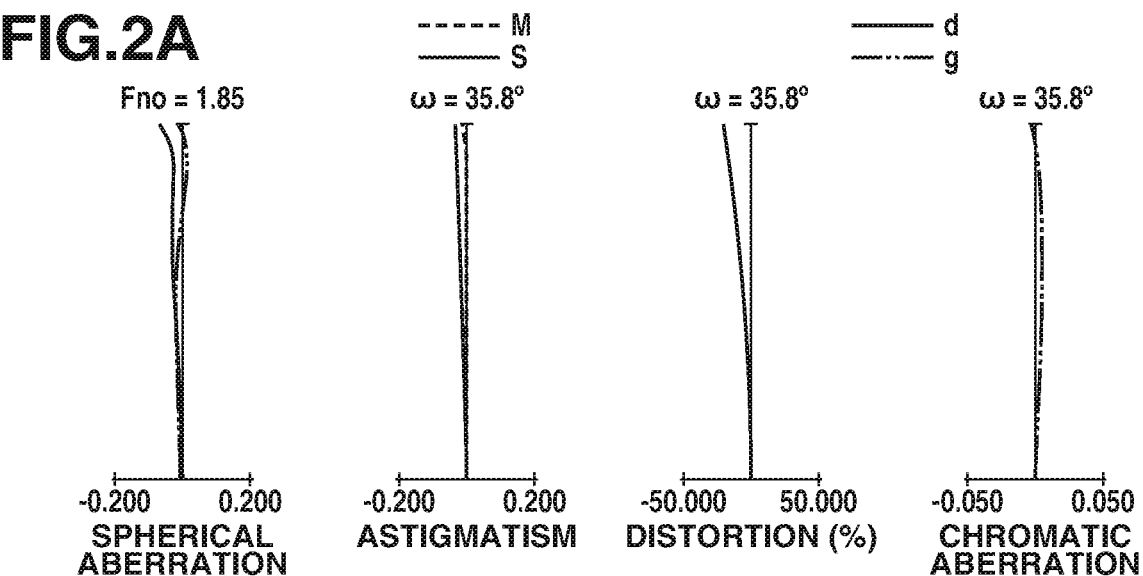
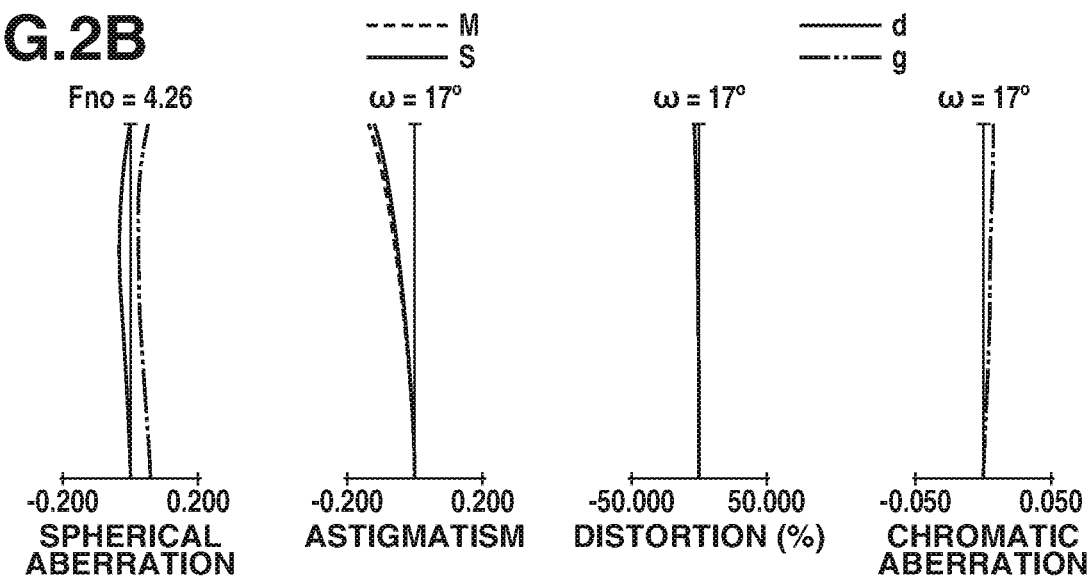
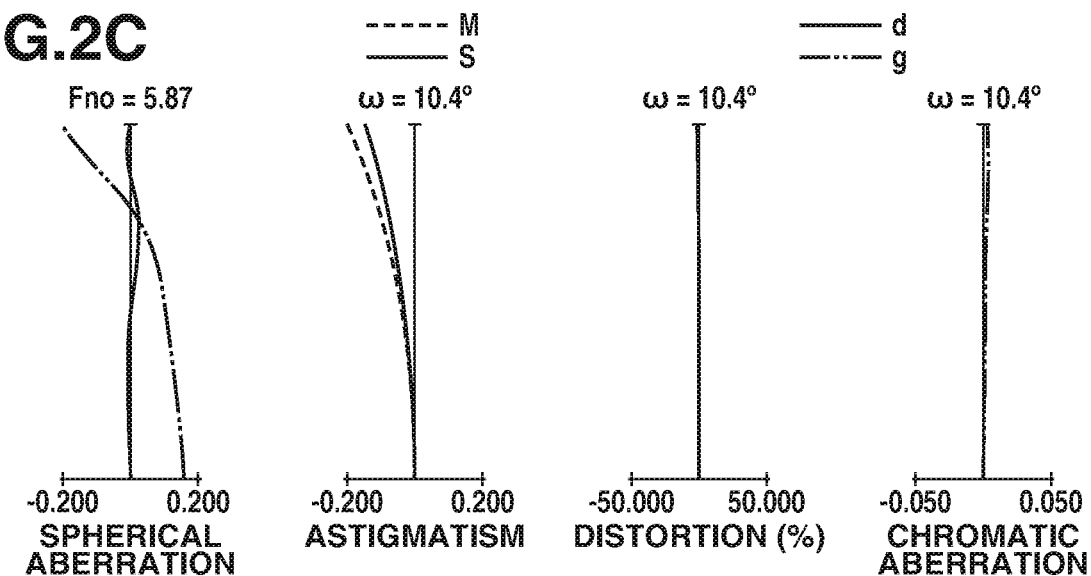

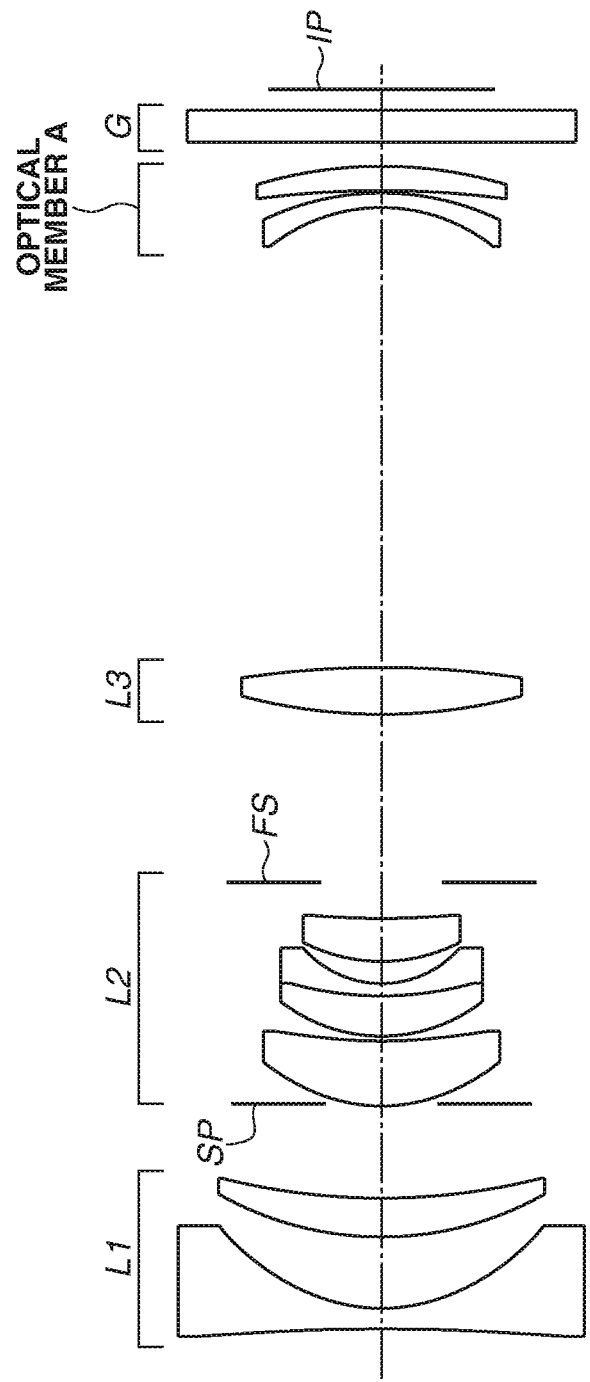

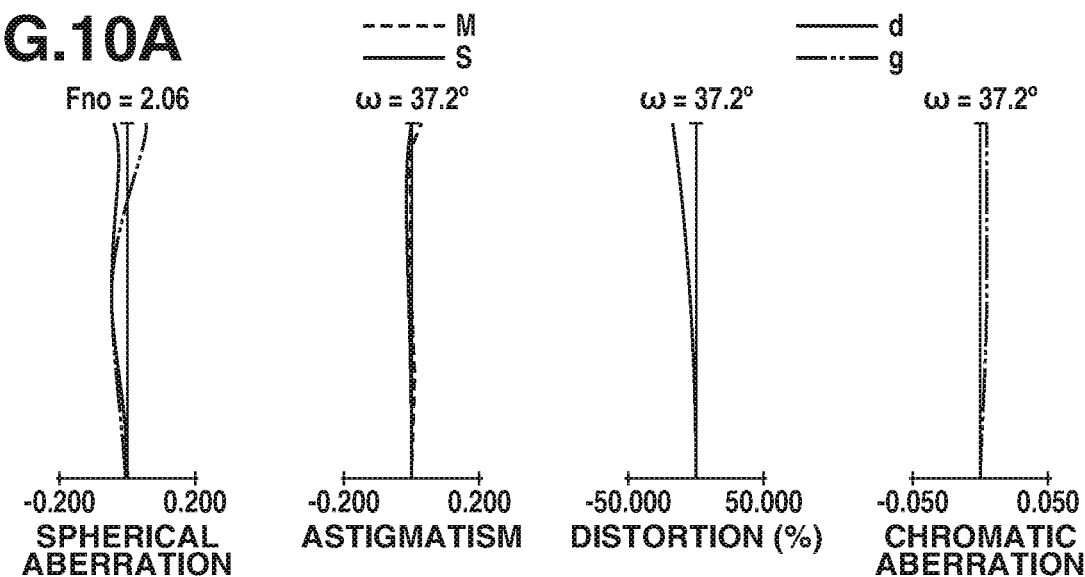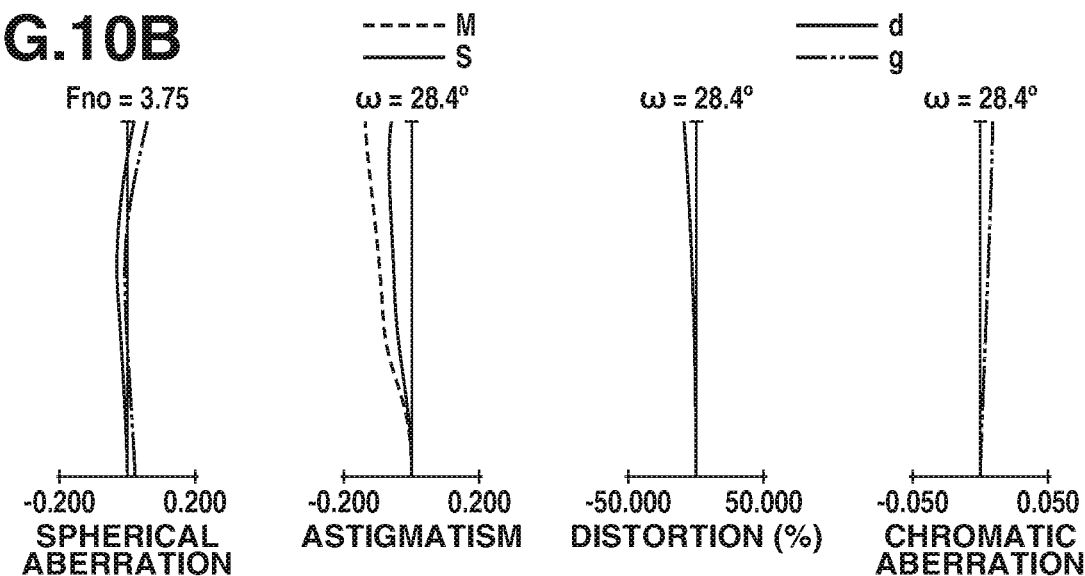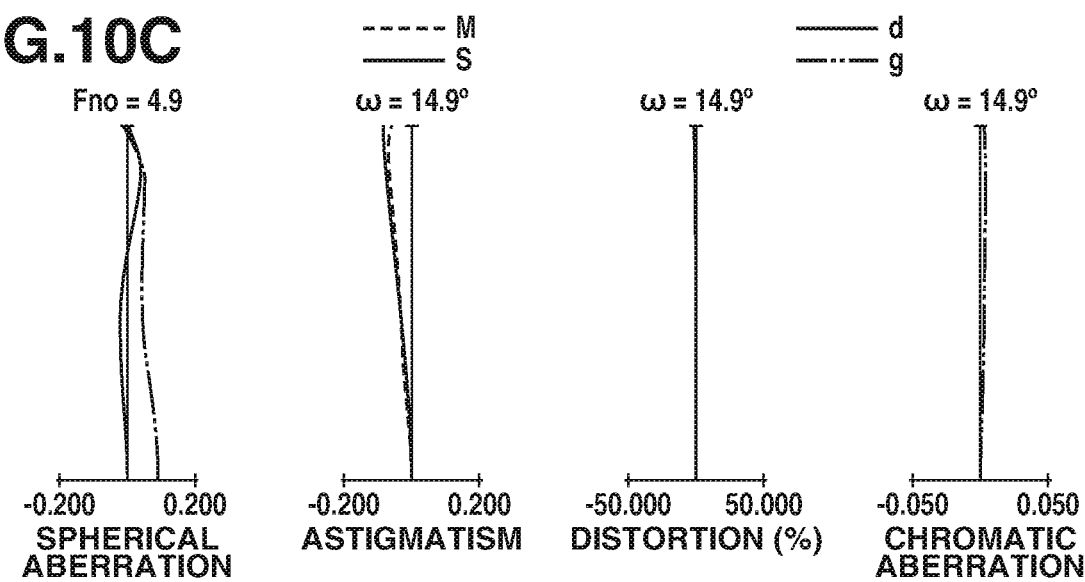

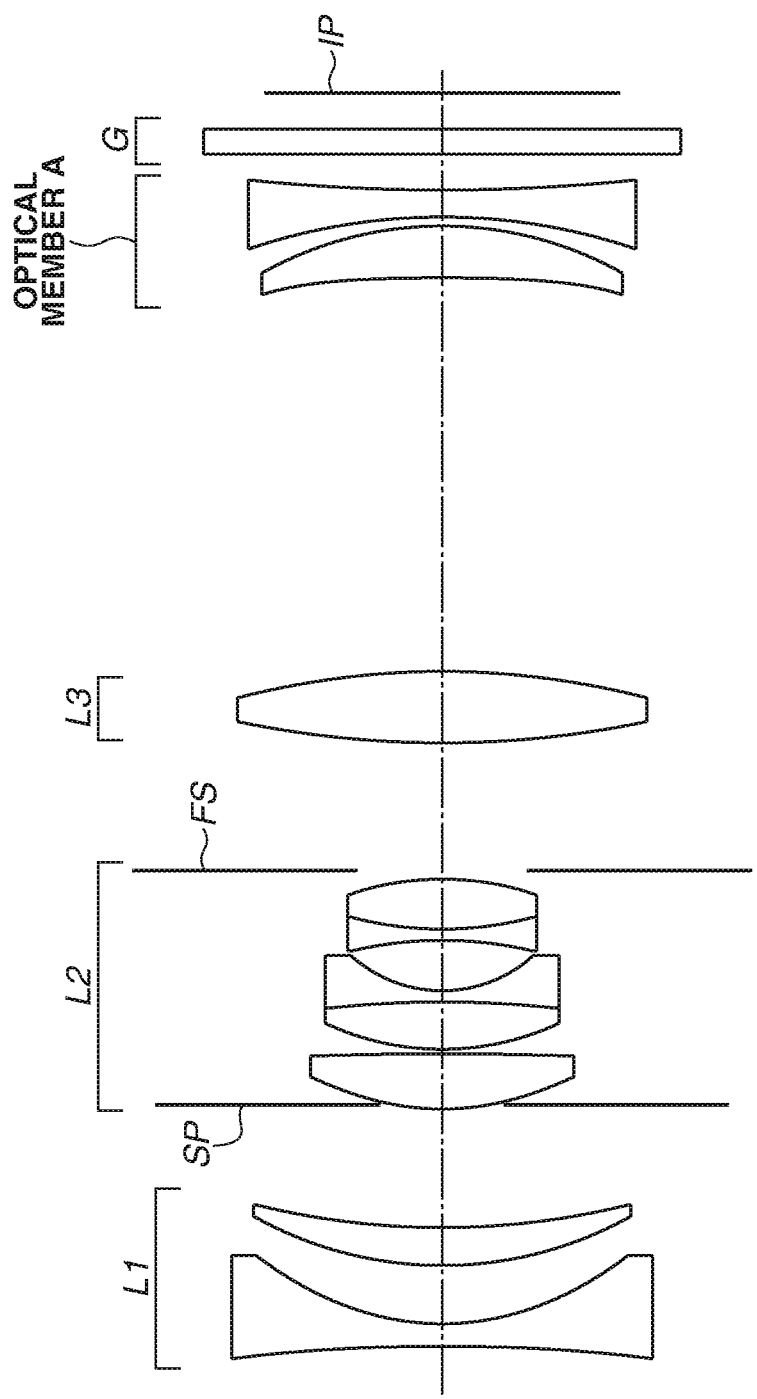

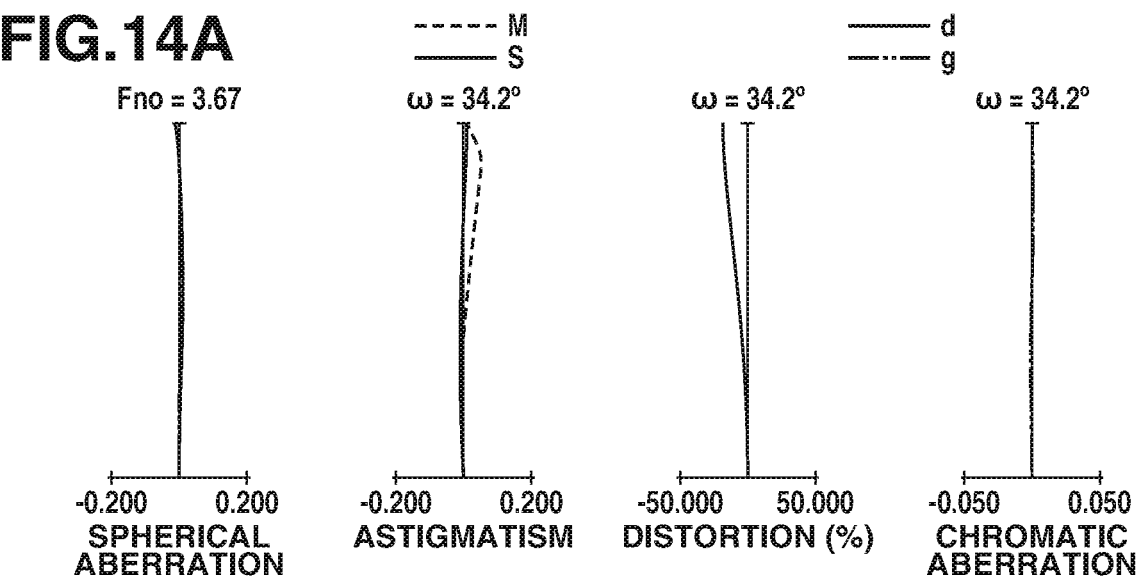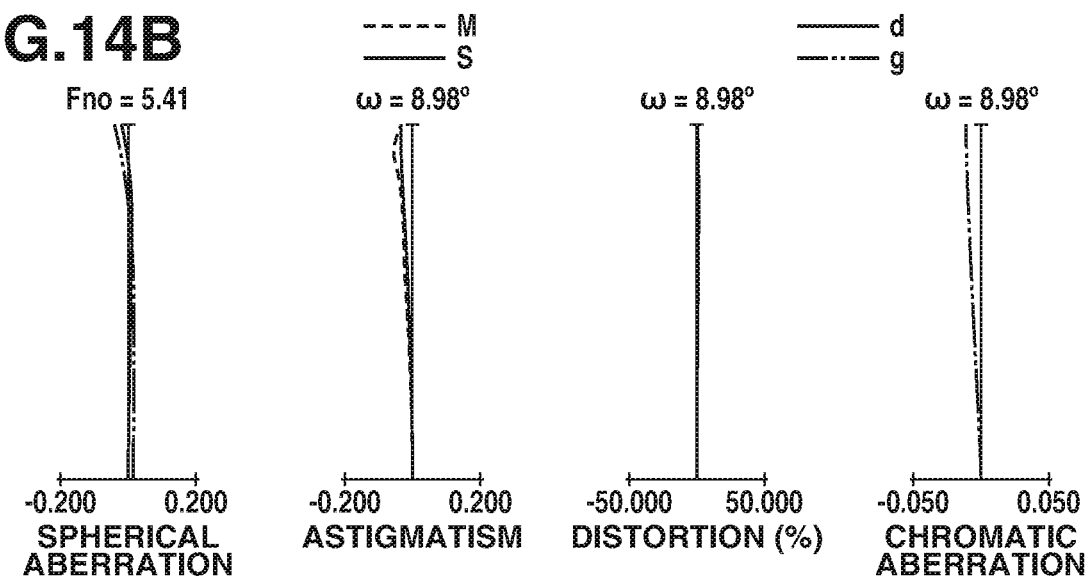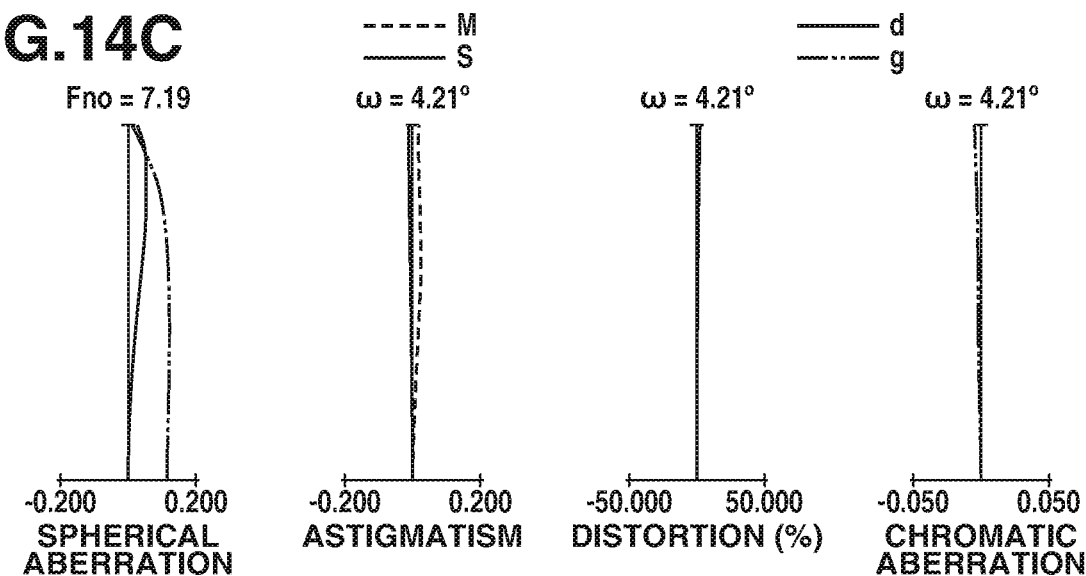

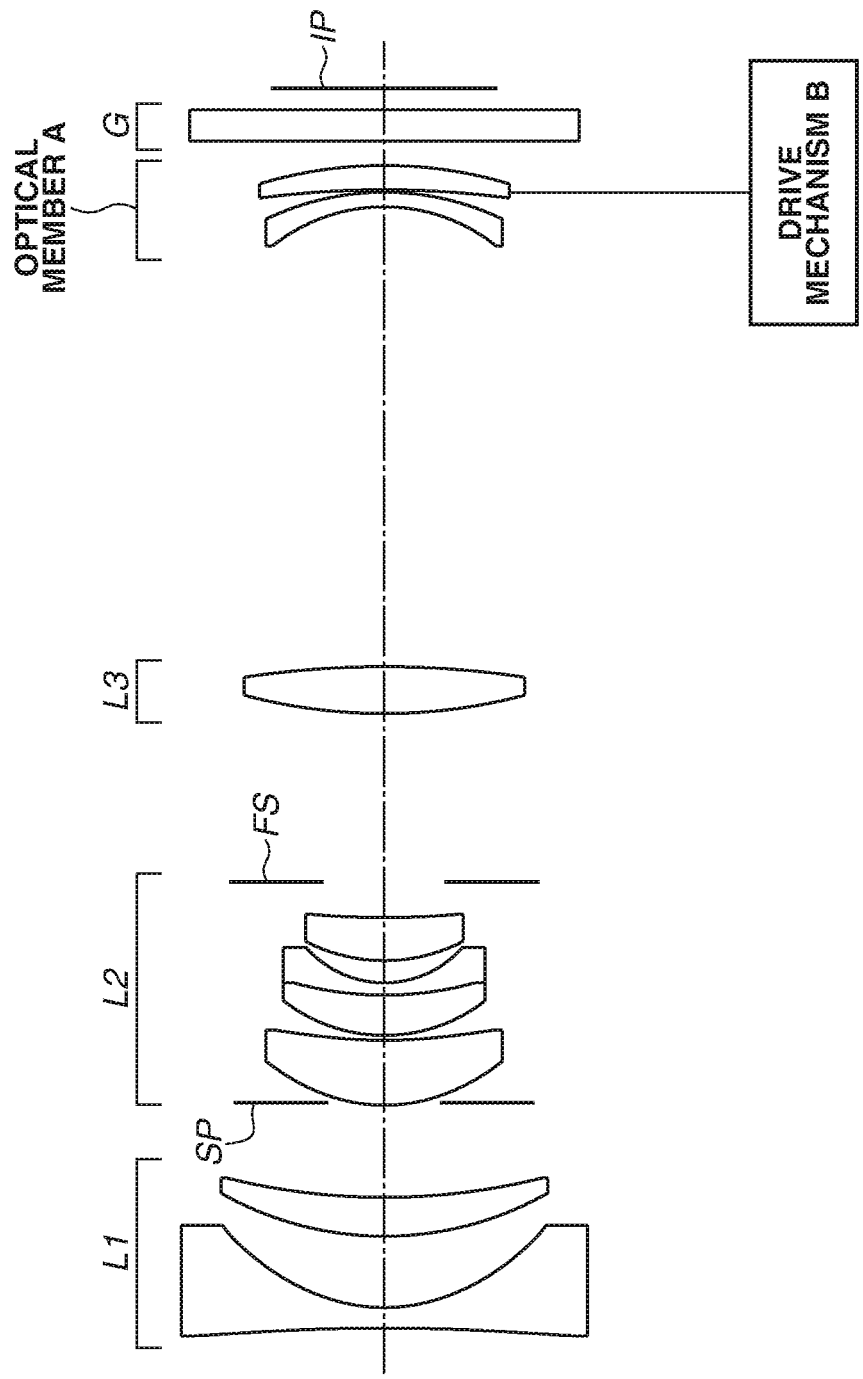

OPTICAL SYSTEM AND IMAGE PICKUP APPARATUS INCLUDING THE SAME

BACKGROUND OF THE INVENTION

Field of Invention

The present disclosure relates generally to optical systems, more particularly it relates an optical system such as a macro lens, and to an image pickup apparatus including the optical system, such as a digital still camera, a video camera, a monitoring camera, or a broadcasting camera, or a camera using a silver-halide film.

Description of Related Art

Recently, there has been an increasing need for macro photography to capture an image using an image pickup apparatus, such as a digital camera or a video camera. Macro photography is a technique used to capture an image of a small object, such as snow crystals or an insect head while magnifying the object. To enable macro photography, an optical system having high imaging magnification is required.

One known technique for increasing the imaging magnification includes the use of a rear conversion lens. According to this known technique, a rear conversion lens is attached on an image side of the imaging lens. Japanese Patent Application Laid-Open No. 63-205627 discusses a rear conversion lens that is inserted between the main lens system and the image plane. Use of the rear conversion lens in addition to the main lens system can achieve an increase in imaging magnification as compared to use of only the main lens system.

In general, an increase in imaging magnification tends to cause degradation in optical performance of the optical system. This makes it difficult to increase the imaging magnification of an optical system, and at the same time, to maintain high optical performance. In Japanese Patent Application Laid-Open No. 63-205627, an imaging lens achieves an increased imaging magnification and high optical performance at the same time by increasing refractive power of a rear conversion lens and by increasing the number of lens elements included in the rear conversion lens.

However, in Japanese Patent Application Laid-Open No. 63-205627, the increased number of lens elements included in the rear conversion lens of the image-capturing optical system leads to an increase in the thickness of the rear conversion lens. This in turn is likely to increase the overall size of the image-capturing optical system. In addition, the increased refractive power of the rear conversion lens tends to cause aberration, such as curvature of field, which further contributes to degradation in optical performance and hinders imaging quality.

SUMMARY OF THE INVENTION

According to the various embodiments of the present invention, an optical system includes an aperture stop, and an optical member that is removably insertable in an optical path defined by an object side and an image side of the optical system, the optical member is disposed on the image side of the aperture stop, wherein, in a first focus range between infinity and a first finite distance, the optical member is removed from the optical path, and, in a second focus range between a second finite distance shorter than the first finite distance and a third finite distance shorter than the second finite distance, the optical member is inserted in the optical path. The optical system satisfies a following condition:

$$|dA/fA|<0.10$$

where dA is a thickness of the optical member on the optical axis, and fA is a focal length of the optical member, and the second focus range covers an in-focus state that satisfies a following condition:

$$0.01<KA/LTK<0.19$$

where LTK is a total length of the optical system, and KA is a distance on the optical axis from a lens surface vertex closest to an object side of the optical member to an image plane.

Further features of the present invention will become apparent from the following description of exemplary embodiments with reference to the attached drawings.

BRIEF DESCRIPTION OF THE DRAWINGS

FIG. 1 is a cross-sectional view illustrating lenses of an optical system focused on an infinitely distant object, where the optical member is removed from the optical path, according to a first exemplary embodiment of the present invention.

FIGS. 2A, 2B, and 2C are each series of aberration diagrams illustrating the optical system focused on an infinitely distant object respectively in a wide-angle end position, in a middle zoom position, and in a telephoto end position, according to the first exemplary embodiment.

FIG. 3 is a cross-sectional view illustrating lenses of the optical system in a second focus range, where the optical member is inserted in the optical path, according to the first exemplary embodiment.

FIGS. 10A, 10B, and 10C are series of aberration diagrams of the optical system focused on an infinitely distant object respectively in a wide-angle end position, in a middle zoom position, and in a telephoto end position, according to the fourth exemplary embodiment.

FIG. 11 is a cross-sectional view illustrating lenses of the optical system in a second focus range, where the optical member is inserted in the optical path, according to the fourth exemplary embodiment.

FIGS. 14A, 14B, and 14C are series of aberration diagrams of the optical system focused on an infinitely distant object respectively in a wide-angle end position, in a middle zoom position, and in a telephoto end position, according to the fifth exemplary embodiment.

FIG. 18 is a schematic diagram illustrating a drive mechanism of an optical member.

DESCRIPTION OF THE EMBODIMENTS

An optical system and an image pickup apparatus including the optical system according to various exemplary embodiments of the present invention will be described in detail below with reference to the attached drawings. In certain exemplary embodiments, the optical system includes an aperture stop and an optical member. The optical member is disposed on an image side of the aperture stop, and is removably insertable in an optical path of the optical system.

In a first focus range from infinity to a first finite distance, the optical member A is removed from the optical path of the optical system. In a second focus range from a second finite distance shorter than the first finite distance, to a third finite distance shorter than the second finite distance, the optical member A is inserted in the optical path of the optical system. In the second focusing position range, an imaging magnification of the optical system increases, so that the optical member A is inserted in the optical path to correct aberrations. As illustrated in FIG. 18, the optical member A is driven by a drive mechanism B, such that the optical member A is inserted in the optical path or is removed from the optical path. For example, in a case where an optical system of a particular exemplary embodiment of the present invention is applied to an interchangeable lens, which can be detachably attached to an image pickup apparatus, the drive mechanism B is included in the interchangeable lens. The drive mechanism B includes an actuator such as a voice coil motor or a stepping motor.

FIG. 1 is a cross-sectional view illustrating lenses of an optical system focused on an infinitely distant object, according to a first exemplary embodiment (hereinafter referred to simply as "first embodiment"). FIGS. 2A, 2B, and 2C are each a series of aberration diagrams of the optical system focused on an infinitely distant object, according to the first embodiment. In the first embodiment, the optical system has a zoom ratio of about 4.71 and an F-number of about 1.85 to 5.87.

Figure 4:
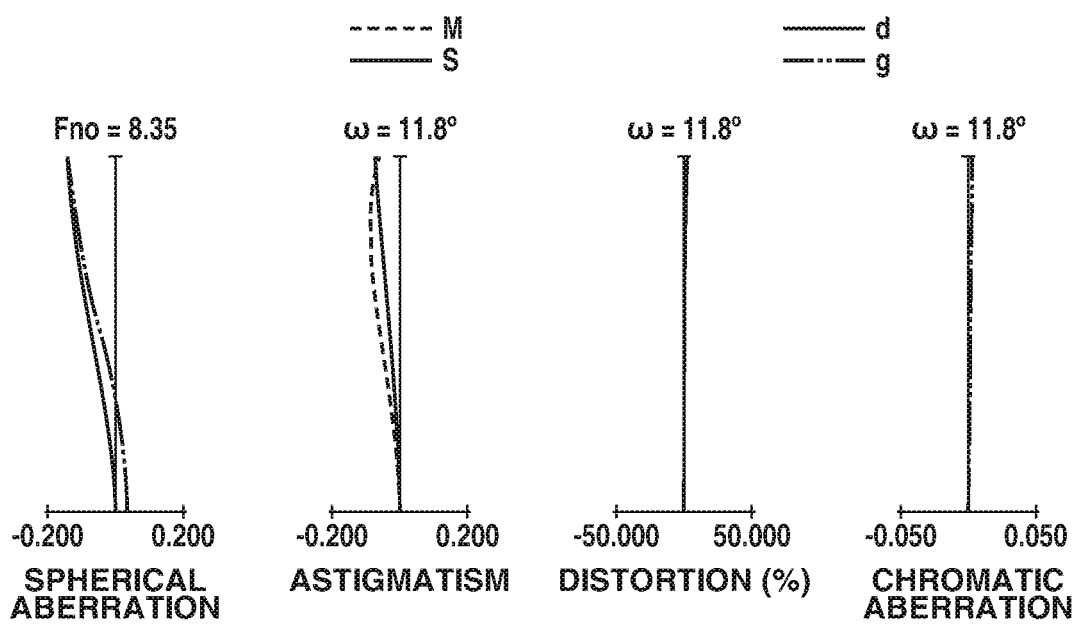
FIG. 4 is a series of aberration diagrams of the optical system in the second focus range in the telephoto end position, according to the first exemplary embodiment.

FIG. 3 is a cross-sectional view illustrating lenses of the optical system in the second focus range, according to the first embodiment. FIG. 3 illustrates the optical member A as positioned on an image side of a third lens unit L3 in a telephoto end position. FIG. 4 is a series of aberration diagrams of the optical system in the second focus range, according to the first embodiment. In FIG. 4, each aberration diagram illustrates aberration in a particular in-focus state in the second focus range in the telephoto end position.

Figure 5:
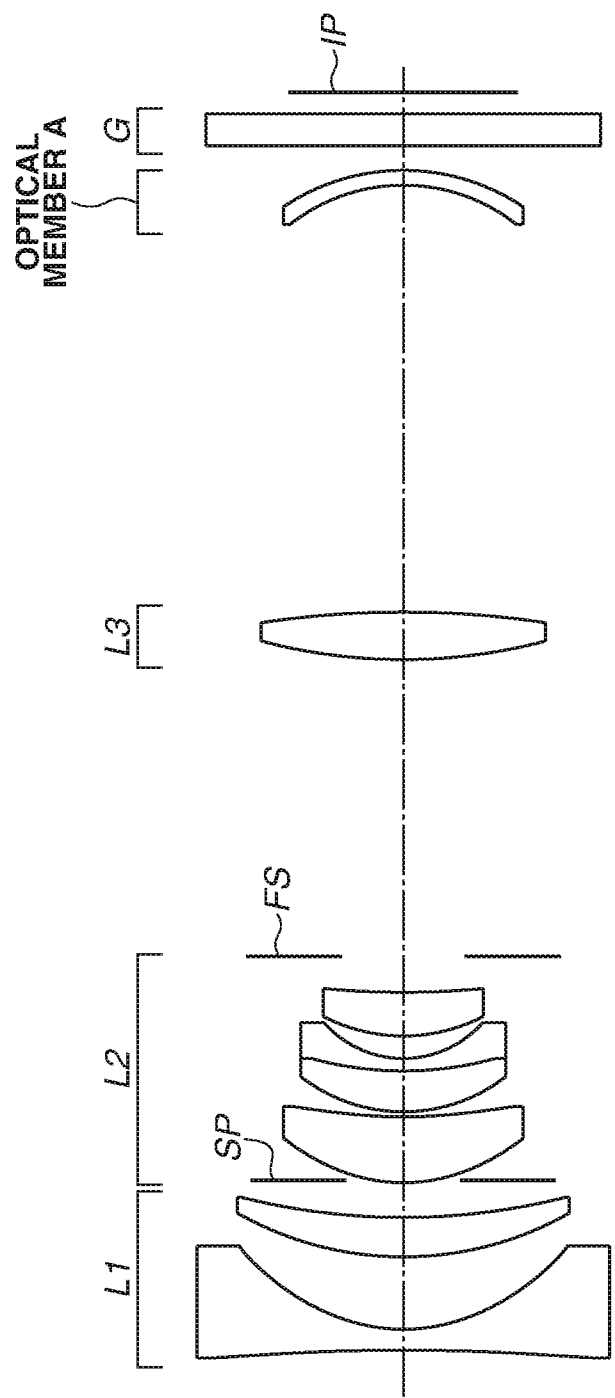
FIG. 5 is a cross-sectional view illustrating lenses of an optical system in a second focus range, where the optical member is inserted in the optical path, according to a second exemplary embodiment.
Figure 6:
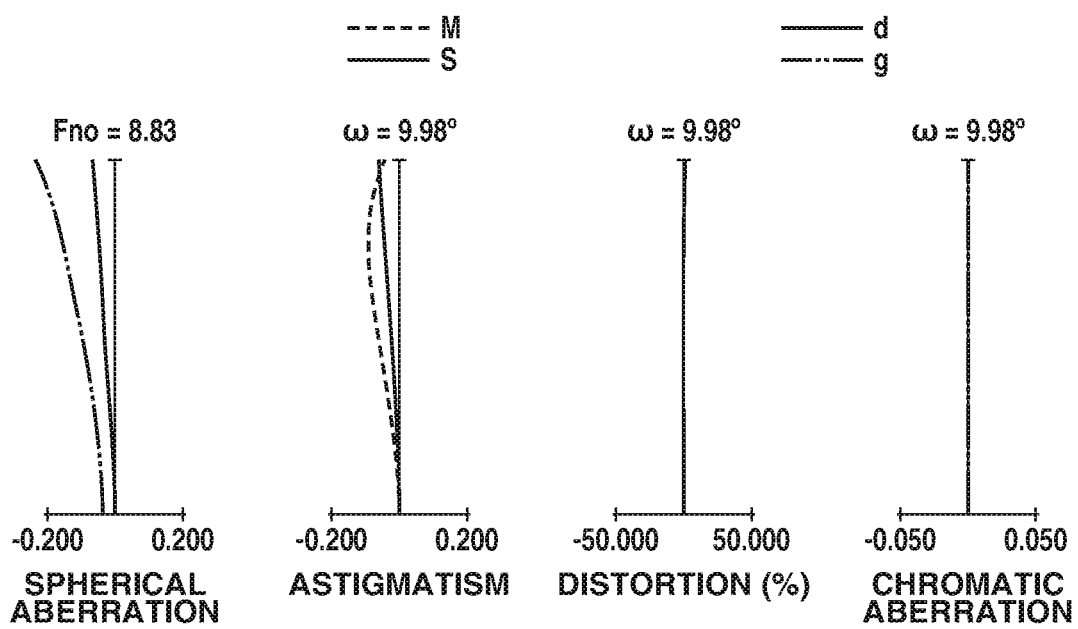
FIG. 6 is a series of aberration diagrams of the optical system in the second focus range in a telephoto end position, according to the second exemplary embodiment.

In a second exemplary embodiment (hereinafter referred to simply as "second embodiment"), the optical system includes an optical member A having a different configuration from the optical system according to the first embodiment. The configurations of the portions other than the optical member A are similar to, or the same as, those of the optical system of the first embodiment. FIG. 5 is a cross-sectional view illustrating lenses of the optical system in the second focus range, according to the second embodiment. FIG. 5 illustrates the optical member A as positioned on an image side of the third lens unit L3 in the telephoto end position. FIG. 6 is a series of aberration diagrams of the optical system in the second focus range, according to the second embodiment. In FIG. 6, each aberration diagram illustrates aberration in a particular in-focus state in the second focus range in the telephoto end position.

Figure 7:
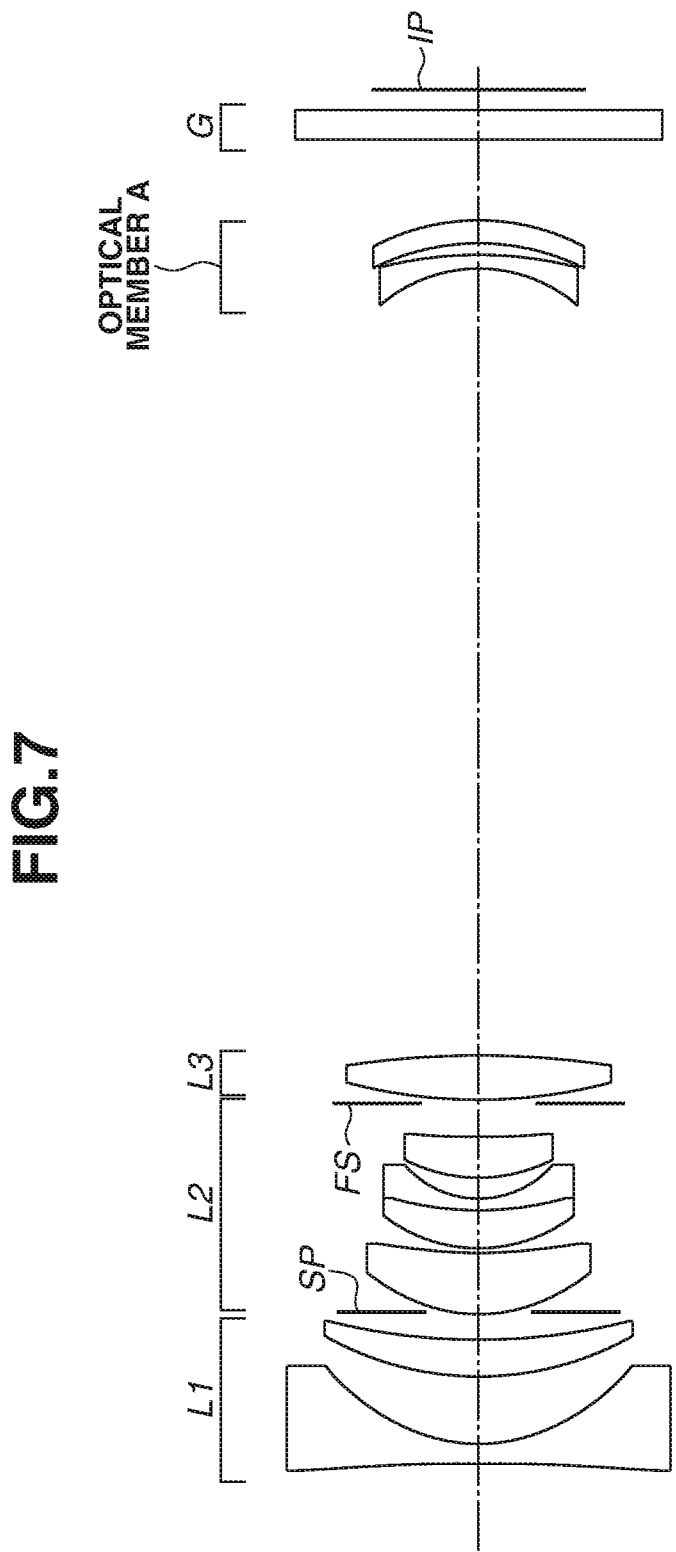
FIG. 7 is a cross-sectional view illustrating lenses of an optical system in a second focus range, where the optical member is inserted in the optical path, according to a third exemplary embodiment.
Figure 8:
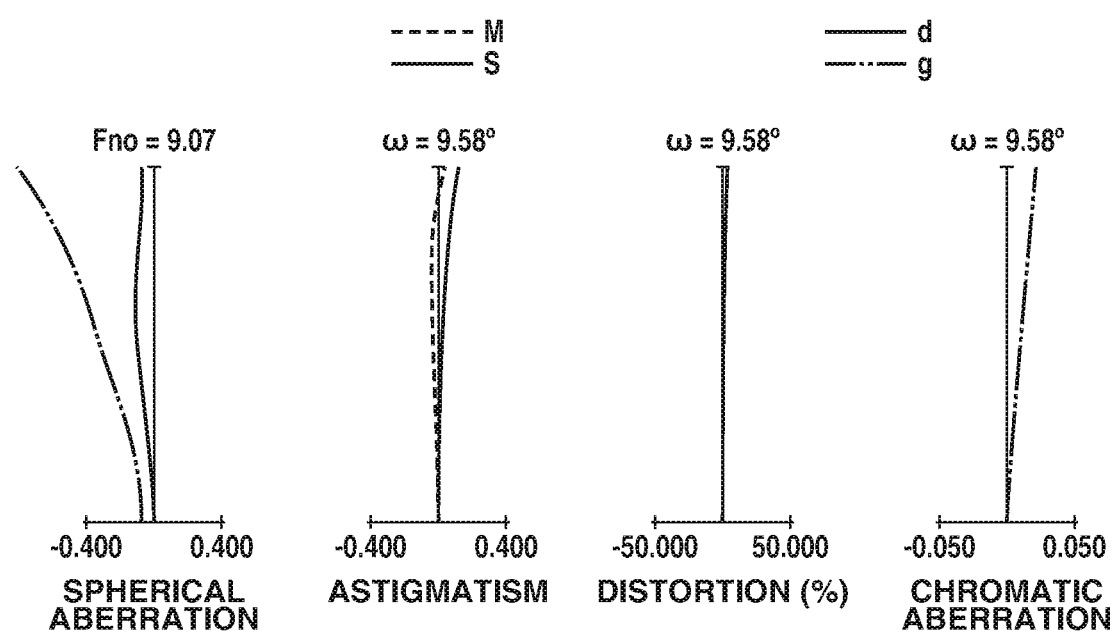
FIG. 8 is a series of aberration diagrams of the optical system in the second focus range in a telephoto end position, according to the third exemplary embodiment.

In a third exemplary embodiment (hereinafter referred to simply as "third embodiment"), the optical system includes an optical member A having a different configuration from the optical system of the first embodiment. The configurations of the portions other than the optical member A are similar to, or the same as, those of the optical system of the first embodiment. FIG. 7 is a cross-sectional view illustrating lenses of an optical system in the second focusing position range, according to the third embodiment. FIG. 7 illustrates the optical member A as positioned on the image side of the third lens unit L3 in the telephoto end position. FIG. 8 is a series of aberration diagrams of the optical system in the second focusing position range, according to the third embodiment. In FIG. 8, each aberration diagram illustrates aberration in a particular in-focus state in the second focusing position range in the telephoto end position.

Figure 9:
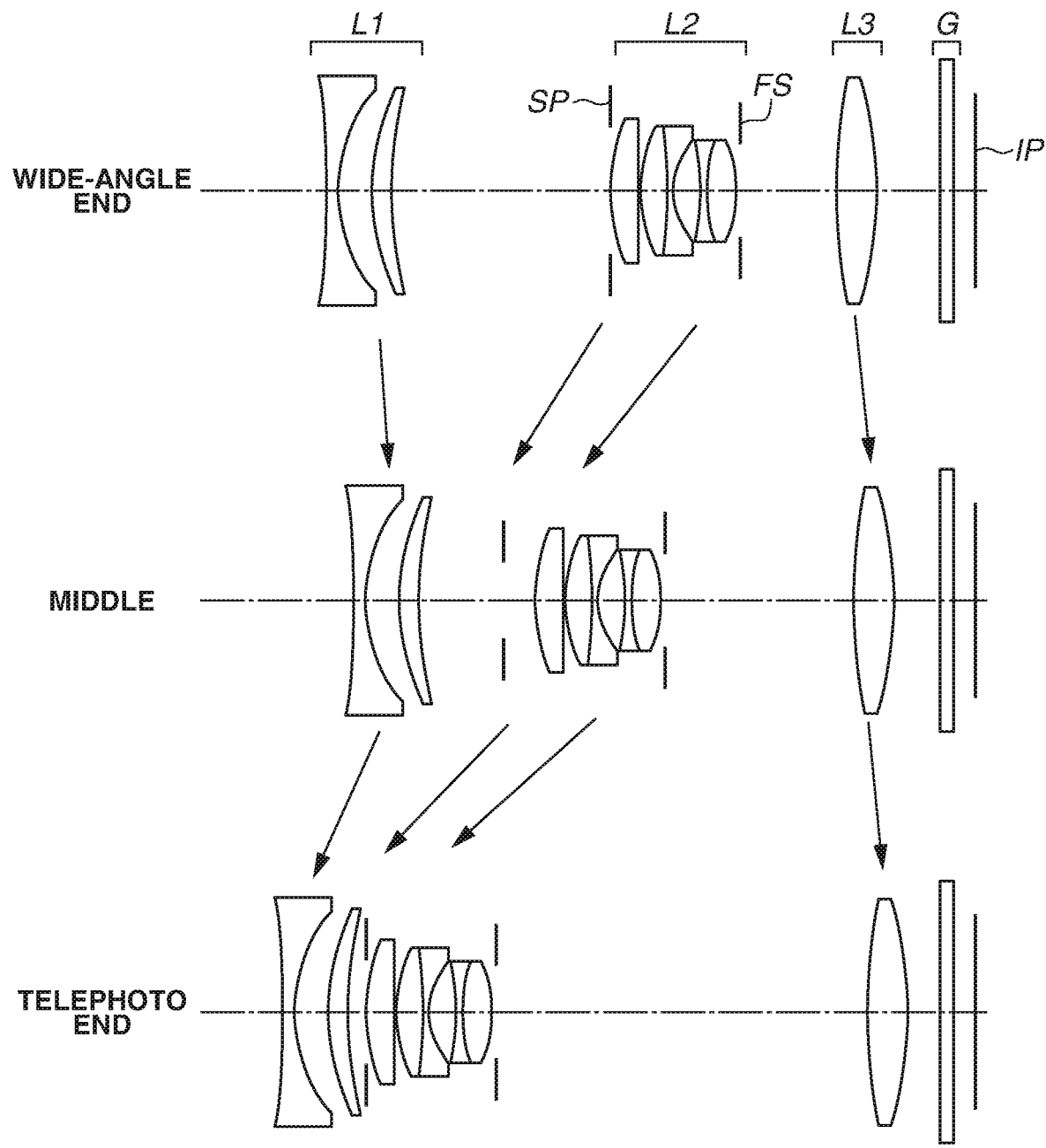
FIG. 9 is a cross-sectional view illustrating lenses of an optical system focused on an infinitely distant object, where the optical member is removed from the optical path, according to a fourth exemplary embodiment.

FIG. 9 is a lens cross-sectional view of an optical system focused on an infinitely distant object, according to a fourth exemplary embodiment (hereinafter referred to simply as "fourth embodiment"). As illustrated in FIG. 9, since the optical system is focused on an infinitely distant object, the optical element A is removed from the optical path, and therefore the optical element A is not shown in FIG. 9. FIGS. 10A, 10B, and 10C are each a series of aberration diagrams of the optical system focused on an infinitely distant object, according to the fourth embodiment. In the fourth embodiment, the optical system has a zoom ratio of about 2.88 and an F-number of about 2.06 to 4.90.

Figure 12:
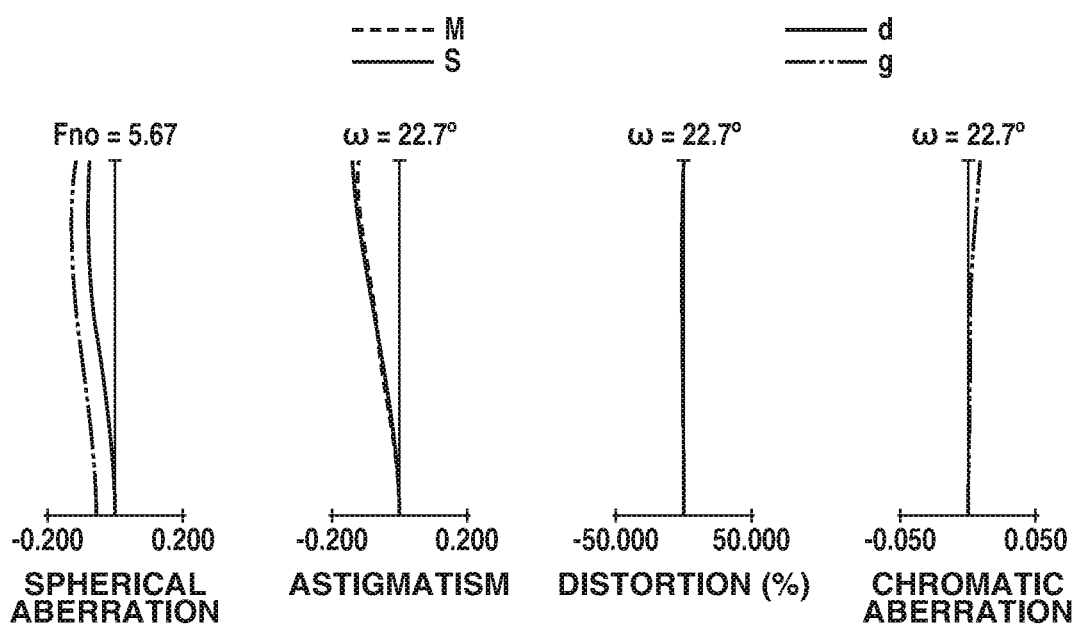
FIG. 12 is a series of aberration diagrams of the optical system in the second focus range in the telephoto end position, according to the fourth exemplary embodiment.

FIG. 11 is a cross-sectional view illustrating lenses of the optical system in the second focusing position range, according to the fourth embodiment. FIG. 11 illustrates the optical member A as positioned on the image side of the third lens unit L3 in the telephoto end position. FIG. 12 is a series of aberration diagrams of the optical system in the second focusing position range, according to the fourth embodiment. In FIG. 12, each aberration diagram illustrates aberration in a particular in-focus state in the second focusing position range in the telephoto end position.

Figure 13:
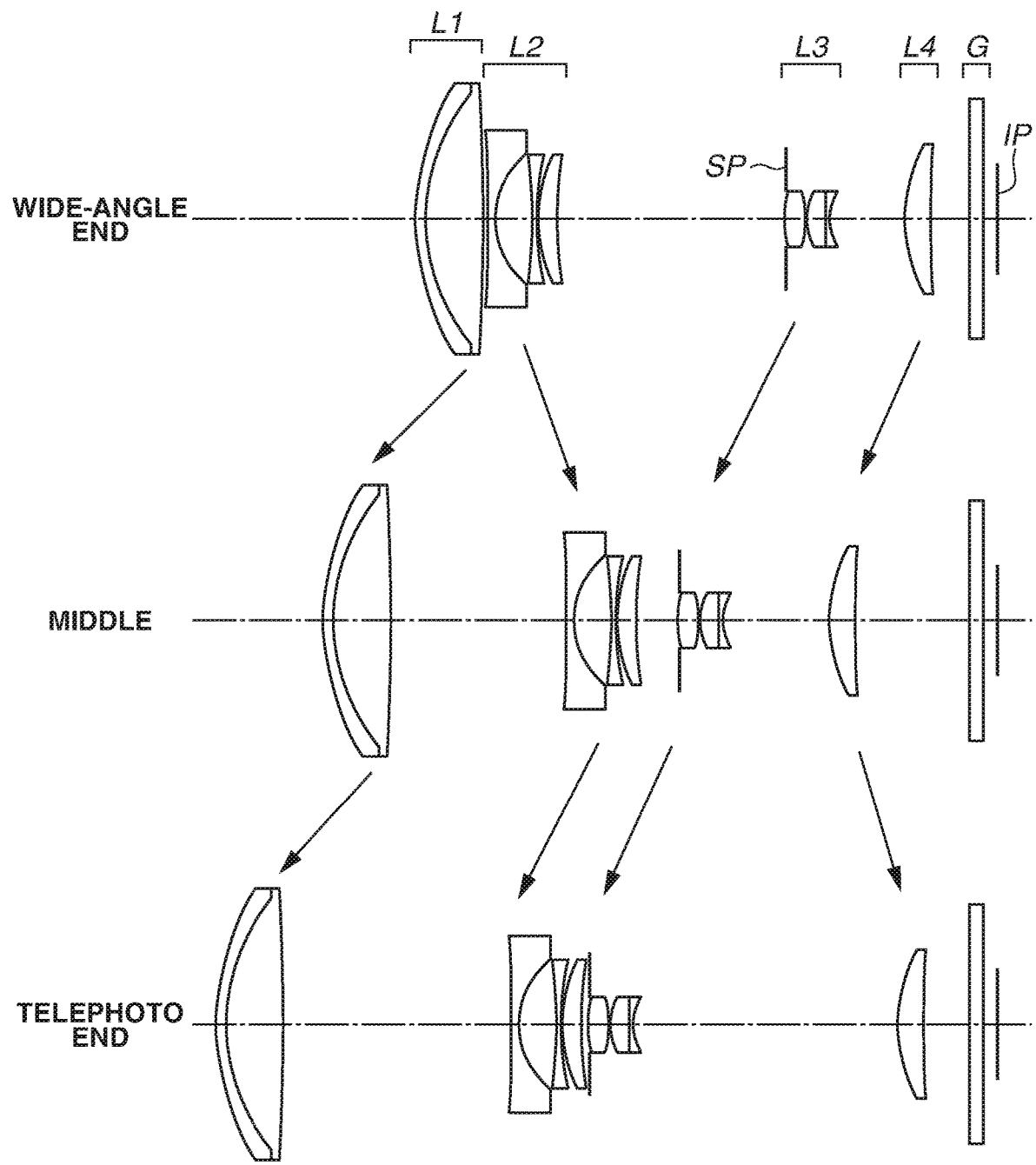
FIG. 13 is a cross-sectional view illustrating lenses of an optical system focused on an infinitely distant object, where the optical member is removed from the optical path, according to a fifth exemplary embodiment.

FIG. 13 is a lens cross-sectional view of an optical system focused on an infinitely distant object, according to a fifth exemplary embodiment (hereinafter referred to simply as "fifth embodiment"). As illustrated in FIG. 13, since the optical system is focused on an infinitely distant object, the optical element A is removed from the optical path, and therefore the optical element A is not shown in FIG. 13. FIGS. 14A, 14B, and 14C are each a series of aberration diagrams of the optical system focused on an infinitely distant object, according to the fifth embodiment. In the fifth embodiment, the optical system has a zoom ratio of about 11.40 and an F-number of about 3.67 to 7.19.

Figure 15:
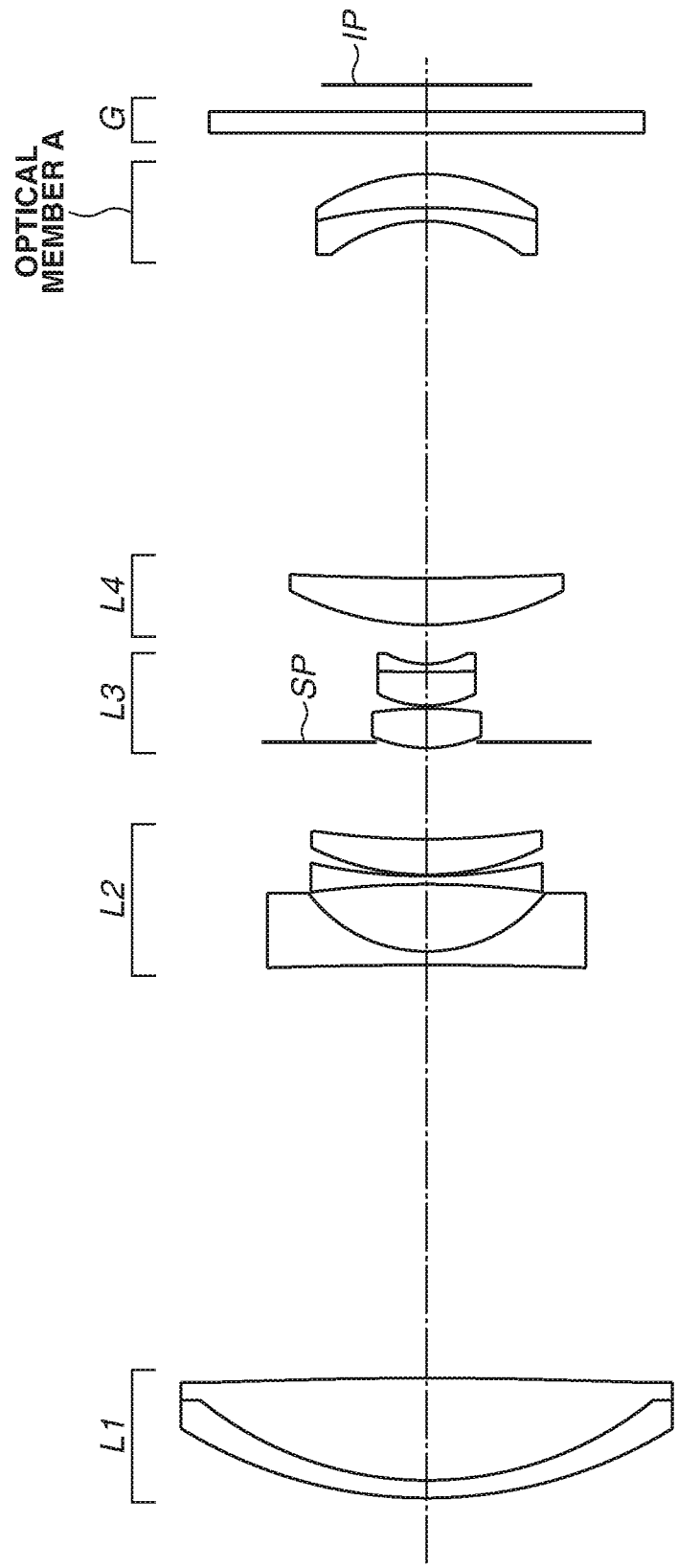
FIG. 15 is a cross-sectional view illustrating lenses of the optical system in the second focus range, where the optical member is inserted in the optical path, according to the fifth exemplary embodiment.
Figure 16:
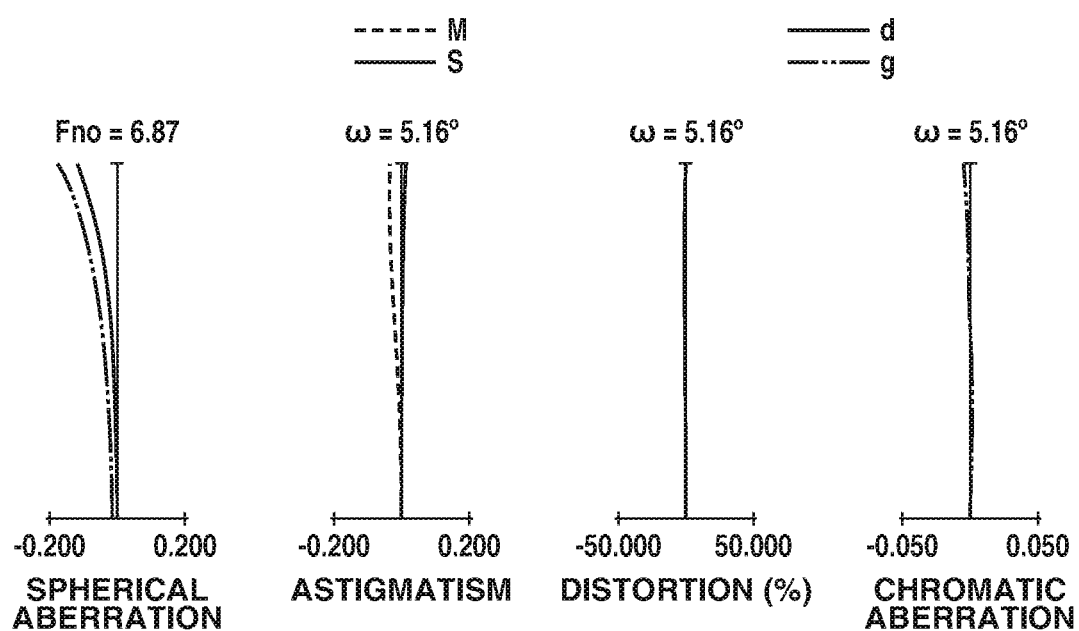
FIG. 16 is a series of aberration diagrams of the optical system in the second focus range in the telephoto end position, according to the fifth exemplary embodiment.

FIG. 15 is a cross-sectional view illustrating lenses of the optical system in the second focus range, according to the fifth embodiment. FIG. 15 illustrates the optical member A as positioned on an image side of a fourth lens unit in the telephoto end position. FIG. 16 is a series of aberration diagrams of the optical system in the second focusing position range, according to the fifth embodiment. In FIG. 16, each aberration diagram illustrates aberration in a particular in-focus state in the second focusing position range in the telephoto end position.

Figure 17:
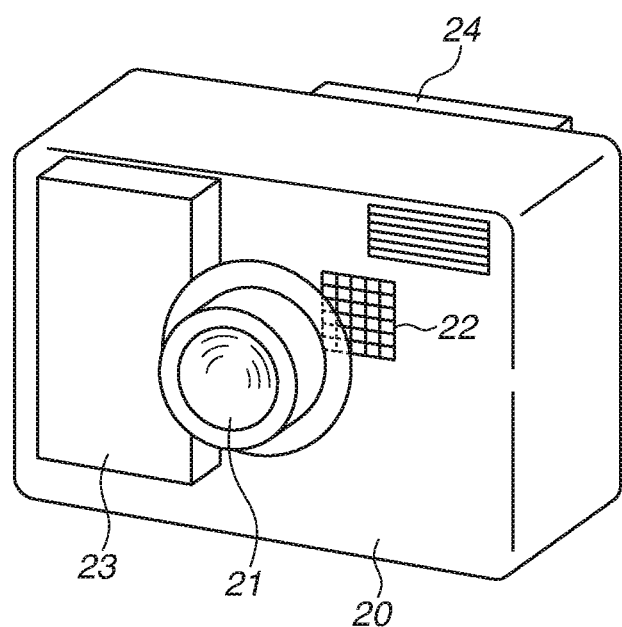
FIG. 17 is a schematic diagram of a main portion of an image pickup apparatus according to one exemplary embodiment of the present invention.

FIG. 17 is a schematic diagram of a main portion of a digital still camera (image pickup apparatus) including an optical system according to one exemplary embodiment of the present invention. The optical system in each of the exemplary embodiments is an imaging lens system for use in an image pickup apparatus, such as a video camera, a digital still camera, a silver-halide film camera, or a television (TV) camera. In each cross-sectional view of a lens, the object side (front side) is illustrated on the left side, and the image side (rear side) is illustrated on the right side. Also in each cross-sectional view of a lens, a symbol "Li" represents an i-th lens unit, where the suffix "i" is a number representing the position of that lens unit in the arrangement order from the object side to the image side. In certain exemplary embodiments, the optical system also includes an aperture stop SP and a flare cut-off stop FS.

The optical system may also include an optical block G, which may be, for example, an optical filter, a face plate, a low-pass filter, or an infrared cut filter, and an image plane IP. When an optical system of a particular exemplary embodiment is applied to an imaging optical system of a video camera or of a monitoring camera, the image plane IP may be a solid-state image sensor (photoelectric conversion element), such as a charge coupled device (CCD) sensor or a complementary metal oxide semiconductor (CMOS) sensor. When an optical system of a particular exemplary embodiment is applied to an imaging optical system of a silver-halide film camera, the image plane IP may be a film plane.

A spherical aberration diagram illustrates spherical aberrations for the d-line (wavelength: 587.6 nm) and for the g-line (wavelength: 435.8 nm) with an F-number illustrated as Fno. An astigmatism diagram illustrates an astigmatism S for a sagittal image plane and an astigmatism M for a meridional image plane. A distortion aberration diagram illustrates a distortion aberration for the d-line. A chromatic aberration diagram illustrates chromatic aberrations for the d- and g-lines with an imaging half viewing angle ω.

In certain exemplary embodiments, when the optical system is in the second focus range that provides a high imaging magnification, the optical member A is inserted in an optical path of the optical system. Insertion of the optical member A allows aberration, such as curvature of field, to be corrected to a satisfactory degree. Therefore, an increase in imaging magnification and reduction/elimination of degradation in optical performance can be both offered.

The optical system of each of the discussed exemplary embodiments satisfies Condition (1) below:

$$|dA/fA|<0.10 \tag{1}$$

and at least partly in the second focus range, satisfies Condition (2) below:

$$0.01<KA/LTK<0.19 \tag{2}$$

where dA is the thickness of the optical member A on the optical axis; fA is the focal length of the optical member A; LTK is the total length of the optical system in the second focusing position range; and KA is the distance on the optical axis from the vertex of the lens surface closest to the object side of the optical member A to the image plane.

Condition (1) specifies the range of the ratio of the thickness dA of the optical member A on the optical axis to the focal length fA of the optical member A. A ratio above the upper limit defined by Condition (1) means excessively high refractive power of the optical member A, and thus results in an excessively large Petzval sum. This makes it difficult to correct the curvature of field to a sufficient degree, and is therefore undesirable. A ratio above the upper limit defined by Condition (1) also means an excessively high thickness dA of the optical member A. This leads to an increased size of the optical system, and is therefore undesirable.

Condition (2) specifies the range of the ratio of the total length LTK of an optical system in the second focus range to the distance KA on the optical axis from the vertex of the lens surface closest to the object side of the optical member A in the second focus range to the image plane. Herein, the optical member A does not move, that is, the distance KA is kept constant, during a focusing operation in the second focus range. The second focus range preferably covers the in-focus state that satisfies Condition (2).

A ratio below the lower limit defined by Condition (2), and hence a short distance KA on the optical axis from the vertex of the lens surface closest to the object side of the optical member A in the second focus range to the image plane, makes it difficult to ensure a sufficient back focus, and is therefore undesirable. A ratio above the upper limit defined by Condition (2), and hence a long distance KA on the optical axis from the vertex of the lens surface closest to the object side of the optical member A in the second focusing position range to the image plane, makes it difficult to correct the curvature of field and/or astigmatism to a sufficient degree, and is therefore undesirable.

Applicable elements are appropriately set to satisfy Conditions (1) and (2) as described above in each of the exemplary embodiments. This ensures that an optical system having both a high imaging magnification and high optical performance is provided.

In each of the discussed exemplary embodiments, the limit values of Conditions (1) and (2) are preferably set as follows:

$$|dA/fA|<0.09 \tag{1a}$$

and $$0.02<KA/LTK<0.17 \tag{2a}$$

More preferably, the limit values of Conditions (1) and (2) are set as follows:

$$|dA/fA|<0.08 \tag{1b}$$

and $$0.03<KA/LTK<0.15 \tag{2b}$$

In each of the exemplary embodiments, the focusing unit of the optical system is positioned on an image side of the aperture stop SP. A ray height becomes relatively low (a diameter of luminous flux becomes relatively small) on the image side of the aperture stop SP, which facilitates reducing the size of the focusing unit.

The optical member A consists of no more than two lenses. Reduction in the number of lenses included in the optical member A as much as possible facilitates reducing the size and weight of the optical system.

Still more preferably, at least one of Conditions presented below is satisfied in each of the exemplary embodiments:

$$0.30<|\beta K|<2.70 \tag{3}$$

$$0.005<dA/LTK<0.100 \tag{4}$$

$$-15.0<LTK/rA<-0.1 \tag{5}$$

$$0.85<|\beta A|<1.25 \tag{6}$$

and $$0.75<LT/LTK<1.20 \tag{7}$$

In the equations above, βK is the imaging magnification of an optical system in the second focus range, rA is the curvature radius of the lens surface closest to the object side of the optical member A, βA is the lateral magnification of the optical member A, and LT is the total length of the optical system focused at infinity. As used herein, a total length of an optical system refers to a sum of the distance on the optical axis from the lens surface closest to the object side to the lens surface closest to the image side of the optical system, and the back focus.

Condition (3) specifies the range of the imaging magnification βK of an optical system in the second focus range. When the optical system is in the second focus range, the optical member A is inserted in the optical path, thereby causing the imaging magnification of the optical system to be increased. The second focus range preferably covers the in-focus state that satisfies Condition (3).

A low imaging magnification βK below the lower limit defined by Condition (3) makes it difficult to capture an image of a small object in sufficient magnification, and is therefore undesirable. A high imaging magnification βK above the upper limit defined by Condition (3) makes it difficult to correct aberration, such as curvature of field, to a satisfactory degree, and is therefore undesirable.

Condition (4) specifies the range of the ratio of the total length LTK of an optical system in the second focus range to the thickness dA of the optical member A on the optical axis. The second focus range preferably covers the in-focus state that satisfies Condition (4). A low thickness dA of an optical member A that leads to a ratio below the lower limit defined by Condition (4) results in a reduced correction effect of the optical member A on aberration such as curvature of field, and thus making it difficult to correct aberration, such as curvature of field, to a satisfactory degree in the entire optical system. Therefore, such a low thickness dA is undesirable. A high thickness dA of an optical member A that leads to a ratio above the upper limit defined by Condition (4) results in a large size of the optical member A. This leads to an increased size of the entire optical system, and is therefore undesirable.

Condition (5) specifies the shape of the lens surface closest to the object side of the optical member A. The lens surface closest to the object side of the optical member A is concave. This enables astigmatism to be corrected to a satisfactory degree. More specifically, Condition (5) specifies the ratio of the total length LTK of an optical system in the second focusing position range to the curvature radius rA of the lens surface closest to the object side of the optical member A. The second focusing position range preferably covers the in-focus state that satisfies Condition (5).

A small curvature radius rA of the lens surface closest to the object side of the optical member A that leads to a ratio below the lower limit defined by Condition (5) results in excessively high refractive power at the lens surface closest to the object side of the optical member A. This causes astigmatism to be corrected to an excessive degree, and is therefore undesirable. A large curvature radius rA of the lens surface closest to the object side of the optical member A that leads to a ratio above the upper limit defined by Condition (5) results in excessively low refractive power at the lens surface closest to the object side of the optical member A. This makes it difficult to correct astigmatism to a sufficient degree, and is therefore undesirable.

Condition (6) specifies the lateral magnification βA of an optical member A. The second focus range preferably covers the in-focus state that satisfies Condition (6). A low lateral magnification βA of the optical member A below the lower limit defined by Condition (6) results in a low imaging magnification of the entire optical system. This makes it difficult to capture an image of a small object in sufficient magnification, and is therefore undesirable. A high lateral magnification βA of the optical member A above the upper limit defined by Condition (6) makes it difficult to correct aberration, such as curvature of field, to a satisfactory degree, and is therefore undesirable.

Condition (7) specifies the range of the ratio of the total length LT of an optical system focused at infinity to the total length LTK of the optical system in the second focus range. The second focusing position range preferably covers the in-focus state that satisfies Condition (7). A long total length LTK of the optical system in the second focus range that leads to a ratio below the lower limit defined by Condition (7) leads to an increased size of the optical system, and is therefore undesirable. A short total length LTK of the optical system in the second focus range that leads to a ratio above the upper limit defined by Condition (7) means that the length available for focusing in the second focus range is short, making it difficult to perform focusing operation, and is therefore undesirable.

The limit values of Conditions (3) to (7) are preferably set as follows:

$$0.35<|\beta K|<2.60 \tag{3a}$$

$$0.007<dA/LTK<0.090 \tag{4a}$$

$$-14.0<LTK/rA<-0.2 \tag{5a}$$

$$0.87<|\beta A|<1.22 \tag{6a}$$

and $$0.77<LT/LTK<1.15 \tag{7a}$$

More preferably, the limit values of Conditions (3) to (7) are set as follows:

$$0.39<|\beta K|<2.50 \tag{3b}$$

$$0.010<dA/LTK<0.080 \tag{4b}$$

$$-13.0<LTK/rA<-0.3 \tag{5b}$$

$$0.90<|\beta A|<1.20 \tag{6b}$$

and $$0.80<LT/LTK<1.10 \tag{7b}$$

The lens configuration of each of the discussed exemplary embodiments will now be described. The optical system according to the first embodiment includes, a first lens unit L1 having negative refractive power, an aperture stop SP, a second lens unit L2 having positive refractive power, a flare cut-off stop FS, a third lens unit L3 having positive refractive power, and an optical member A having negative refractive power in order from the object side to the image side. In a first focus range, as illustrated in FIG. 1, the optical member A is removed from the optical path. In the second focus range, as illustrated in FIG. 3, the optical member A having negative refractive power is positioned on the image side of the third lens unit L3. The optical member A consists of a negative lens and a positive lens, in order from the object side to the image side, each having the concave surface facing toward the object. The optical system in the in-focus state illustrated in FIG. 3 has a imaging magnification of −1.0×.

In a zoom operation, the first, second, and third lens units L1, L2, and L3 are moved so that the distance between the first lens unit L1 and the second lens unit L2 is reduced, and that the distance between the second lens unit L2 and the third lens unit L3 is increased, in the telephoto end position as compared to those in the wide-angle end position. In a zoom operation, the aperture stop SP is moved along a different path from those of the lens units L1, L2, and L3, while the flare cut-off stop FS is moved with the second lens unit L2 in an integrated manner. In the first focus range, the third lens unit L3 is moved toward the object side during a focusing operation in a direction from infinity to a near object. In the second focus range, the second lens unit L2 is moved toward the image side, while the third lens unit L3 is moved toward the object side, during a focusing operation. Moving a plurality of lens units during a focusing operation achieves both an increased imaging magnification and high optical performance.

The optical system of the second embodiment is similar to, or the same as, the optical system of the first embodiment except that the optical member A has a different configuration from the configuration of the optical member A of the first embodiment. The optical member A according to the second exemplary embodiment consists of a negative lens with the concave surface facing toward the object side, as illustrated in FIG. 5. In the second focus range, the third lens unit L3 is moved toward the object side during a focusing operation. The optical system in the in-focus state illustrated in FIG. 5 has a imaging magnification of −0.5×.

The optical system according to the third embodiment is similar to, or the same as, the optical system of the first embodiment except that the optical member A has a different configuration from the configuration of the optical member A of the first and second embodiments. The optical member A of according to the third exemplary embodiment consists of a negative lens and a positive lens in order from the object side to the image side, each having the concave surface facing toward the object side, as illustrated in FIG. 7. In the second focus range, the first lens unit L1 is moved toward the object side, the second lens unit L2 is moved toward the object side, and the third lens unit L3 is also moved toward the object side, during a focusing operation. The optical system in the in-focus state illustrated in FIG. 7 has an imaging magnification of −2.1×. Moving a plurality of lens units during a focusing operation achieves both an increased imaging magnification and high optical performance.

The optical system of the fourth embodiment includes, a first lens unit L1 having negative refractive power, an aperture stop SP, a second lens unit L2 having positive refractive power, a flare cut-off stop FS, a third lens unit L3 having positive refractive power, and an optical element A in order from the object side to the image side. In a first focus range, as illustrated in FIG. 9, the optical member A is removed from the optical path. In the second focus range, as illustrated in FIG. 11, the optical member A having positive refractive power is positioned on an image side of the third lens unit L3. The optical member A consists of a positive lens and a negative lens, in order from the object side to the image side, each having the concave surface facing toward the object side. The optical system in the in-focus state illustrated in FIG. 11 has an imaging magnification of −0.7×.

In a zoom operation, the first, second, and third lens units L1, L2, and L3 are moved so that the distance between the first lens unit L1 and the second lens unit L2 is reduced, and that the distance between the second lens unit L2 and the third lens unit L3 is increased, in the telephoto end position as compared to those in the wide-angle end position. In a zoom operation, the aperture stop SP is moved along a different path from those of the lens units L1, L2, and L3, while the flare cut-off stop FS is moved with the second lens unit L2 in an integrated manner. In the first focus range, the third lens unit L3 is moved toward the object side during a focusing operation in a direction from infinity to a near object. In the second focus range, the second lens unit L2 is moved toward the image side, while the third lens unit L3 is moved toward the object side, during a focusing operation. Moving a plurality of lens units for focusing achieves both an increased imaging magnification and high optical performance.

The optical system according to the fifth embodiment includes, a first lens unit L1 having positive refractive power, a second lens unit L2 having negative refractive power, an aperture stop SP, a third lens unit L3 having positive refractive power, a fourth lens unit L4 having positive refractive power, and an optical member A in order from the object side to the image side. In a first focus range, as illustrated in FIG. 13, the optical member A is removed from the optical path. In the second focus range, as shown in FIG. 15, an optical member A having negative refractive power is positioned on the image side of the fourth lens unit L4. The optical member A consists of a cemented lens of a negative lens and a positive lens each having the concave surface facing toward the object side. The optical system in the in-focus state illustrated in FIG. 15 has an imaging magnification of −0.4×.

In a zoom operation, the lens units L1, L2, and L3 are moved so that the distance between the first lens unit L1 and the second lens unit L2 is increased, the distance between the second lens unit L2 and the third lens unit L3 is reduced, and the distance between the third lens unit L3 and the fourth lens unit L4 is increased, in the telephoto end position as compared to those in the wide-angle end position. In a zoom operation, the aperture stop SP is moved along a different path from those of the lens units L1, L2, and L3. In the first focus range, the fourth lens unit L4 is moved toward the object side during a focusing operation in a direction from infinity to a near object. In the second focus range, the third lens unit L3 is moved toward the image, while the fourth lens unit L4 is moved toward the object side, during a focusing operation. Moving a plurality of lens units during a focusing operation achieves both an increased imaging magnification and high optical performance.

Next, lens data of Numerical Examples 1 to 5, respectively corresponding to the first to fifth embodiments described above, will be presented below. In the Numerical Examples, the suffix "i" represents a number indicating the position of each optical surface (or optical element) in the arrangement order from the object side to the image side. For example, ri is a curvature radius of the i-th optical surface; di is a distance between the i-th and (i+1)th surfaces; and ndi and vdi are respectively a refractive index and an Abbe number for the d-line of the i-th optical element.

Some optical surfaces are aspheric, and such aspheric surfaces are designated by an asterisk "*" to the right of the surface number. An aspheric shape is given by the following equation:

$$x=(h^2/r)/[1+[1-(1+K)(h/r)^2]^{1/2}]+A4h^4+A6h^6+A8h^8+A10h^{10}+A12h^{12}$$

where K is the eccentricity, A4, A6, A8, A10, and A12 are aspheric coefficients, x is a deviation along an optical axis direction at a height h from the optical axis relative to the surface vertex, and r is a paraxial curvature radius. The notation "e-Z" is used to represent the exponential expression "$10^{-Z}$."

In each of the Numerical Examples, a back focus (BF) is the distance from the surface closest to the image side of that lens system to the image plane that is expressed in an air conversion length. Relationships between Numerical Examples and the mathematical Conditions described above are summarized in Table 1.

NUMERICAL EXAMPLE 1

(1) Focused on Object at Infinity

Unit: mm

| Surface No. | r | d | nd | vd |
|---|---|---|---|---|
| 1* | −126.177 | 0.85 | 1.85104 | 40.3 |
| 2* | 7.048 | 2.93 | | |
| 3 | 13.616 | 1.60 | 1.95906 | 17.5 |
| 4 | 26.806 | (variable) | | |
| 5 (Stop) | ∞ | (variable) | | |
| 6* | 6.790 | 2.67 | 1.76753 | 49.3 |
| 7* | 18.546 | 0.21 | | |
| 8 | 6.754 | 1.65 | 1.48749 | 70.2 |
| 9 | 13.961 | 0.51 | 1.85478 | 24.8 |
| 10 | 4.278 | 0.91 | | |
| 11* | 6.751 | 1.77 | 1.69350 | 53.2 |
| 12 | 33.956 | 1.46 | | |
| 13 | ∞ | (variable) | | |
| 14 | 22.424 | 1.93 | 1.48749 | 70.2 |
| 15 | −38.354 | (variable) | | |
| 16 | ∞ | 1.30 | 1.51633 | 64.1 |
| 17 | ∞ | 0.87 | | |
| Image Plane | ∞ | | | |

Data on Aspheric Surfaces

1st Surface

K = 0.00000e+000 A4 = −2.02625e−004 A6 = 7.87010e−006
A8 = −1.26746e−007 A10 = 7.76461e−010

2nd Surface

K = 0.00000e+000 A4 = −4.77965e−004 A6 = 1.90614e−006
A8 = 5.66789e−008 A10 = −4.59701e−009

6th Surface

K = 0.00000e+000 A4 = −2.98216e−004 A6 = −4.10038e−006
A8 = −5.92404e−008

7th Surface

K = 0.00000e+000 A4 = −4.58162e−004 A6 = 7.11715e−006
A8 = −3.73866e−009

11th Surface

K = 0.00000e+000 A4 = −5.15595e−004 A6 = 4.42038e−006
A8 = 1.67647e−006

Unit: mm

Other Data
Zoom Ratio 4.71

| | Wide-Angle | Middle | Telephoto |
|---|---|---|---|
| Focal Length | 5.36 | 15.23 | 25.24 |
| F-number | 1.85 | 4.26 | 5.87 |
| Half Viewing Angle | 35.78 | 16.98 | 10.44 |
| Image Height | 3.86 | 4.65 | 4.65 |
| Total Lens Length | 44.28 | 41.62 | 50.50 |
| BF | 4.79 | 4.63 | 4.47 |
| d 4 | 18.30 | 1.94 | 1.51 |
| d 5 | 1.00 | 2.63 | −0.10 |
| d13 | 3.71 | 15.93 | 28.15 |
| d15 | 3.06 | 2.90 | 2.74 |

Data on Zoom Lens Units

| Unit | Start Surface | Focal Length |
|---|---|---|
| 1 | 1 | −12.35 |
| 2 | 6 | 12.23 |
| 3 | 14 | 29.33 |

Focusing unit: third lens unit (2) Particular In-Focus State in Second Focusing Position Range in Telephoto End Position Unit: mm Data on Surfaces

| Surface No. | r | d | nd | vd |
|---|---|---|---|---|
| 1* | −126.177 | 0.85 | 1.85104 | 40.3 |
| 2* | 7.048 | 2.93 | | |
| 3 | 13.616 | 1.60 | 1.95906 | 17.5 |
| 4 | 26.806 | 3.89 | | |
| 5 (Stop) | ∞ | −0.10 | | |
| 6* | 6.790 | 2.67 | 1.76753 | 49.3 |
| 7* | 18.546 | 0.21 | | |
| 8 | 6.754 | 1.65 | 1.48749 | 70.2 |
| 9 | 13.961 | 0.51 | 1.85478 | 24.8 |
| 10 | 4.278 | 0.91 | | |
| 11* | 6.751 | 1.77 | 1.69350 | 53.2 |
| 12 | 33.956 | 1.46 | | |
| 13 | ∞ | 6.92 | | |
| 14 | 22.424 | 1.93 | 1.48749 | 70.2 |
| 15 | −38.354 | 18.89 | | |
| 16 | −7.379 | 0.60 | 1.77250 | 49.6 |
| 17 | −11.219 | 0.10 | | |
| 18 | −38.690 | 1.00 | 1.84666 | 23.8 |
| 19 | −17.777 | 1.00 | | |
| 20 | ∞ | 1.30 | 1.51633 | 64.1 |
| 21 | ∞ | 0.87 | | |
| Image Plane | ∞ | | | |

Data on Aspheric Surfaces

1st Surface

K = 0.00000e+000 A4 = −2.02625e−004 A6 = 7.87010e−006
A8 = −1.26746e−007 A10 = 7.76461e−010

2nd Surface

K = 0.00000+000 A4 = −4.77965e−004 A6 = 1.90614e−006
A8 = 5.66789e−008 A10 = −4.59701e−009

6th Surface

K = 0.00000e+000 A4 = −2.98216e−004 A6 = −4.10038e−006
A8 = −5.92404e−008

7th Surface

K = 0.00000e+000 A4 = −4.58162e−004 A6 = 7.11715e−006
A8 = −3.73866e−009

-continued

Unit: mm

11th Surface

K = 0.00000e+000 A4 = −5.15595e−004 A6 = 4.42038e−006
A8 = 1.67647e−006

Data on Zoom Lens Units

| Unit | Start Surface | Focal Length |
|---|---|---|
| 1 | 1 | −12.35 |
| 2 | 6 | 12.23 |
| 3 | 14 | 29.33 |
| 4 | 16 | −192.12 |

Focusing unit: second lens unit and third lens unit
Imaging magnification: −1.0x

NUMERICAL EXAMPLE 2

(1) Focused on Object at Infinity

When focused on object at infinity, all values same as Numerical Example 1.

(2) Particular In-Focus State in Second Focusing Position Range in Telephoto End Position Unit: mm Data on Surfaces

| Surface No. | r | d | nd | vd |
|---|---|---|---|---|
| 1* | −126.177 | 0.85 | 1.85104 | 40.3 |
| 2* | 7.048 | 2.93 | | |
| 3 | 13.616 | 1.60 | 1.95906 | 17.5 |
| 4 | 26.806 | 1.51 | | |
| 5 (Stop) | ∞ | −0.10 | | |
| 6* | 6.790 | 2.67 | 1.76753 | 49.3 |
| 7* | 18.546 | 0.21 | | |
| 8 | 6.754 | 1.65 | 1.48749 | 70.2 |
| 9 | 13.961 | 0.51 | 1.85478 | 24.8 |
| 10 | 4.278 | 0.91 | | |
| 11* | 6.751 | 1.77 | 1.69350 | 53.2 |
| 12 | 33.956 | 1.46 | | |
| 13 | ∞ | 12.01 | | |
| 14 | 22.424 | 1.93 | 1.48749 | 70.2 |
| 15 | −38.354 | 17.28 | | |
| 16 | −7.405 | 0.60 | 1.76182 | 26.5 |
| 17 | −8.710 | 1.00 | | |
| 18 | ∞ | 1.30 | 1.51633 | 64.1 |
| 19 | ∞ | 0.87 | | |
| Image Plane | ∞ | | | |

Data on Aspheric Surfaces

1st Surface

K = 0.00000e+000 A4 = −2.02625e−004 A6 = 7.87010e−006
A8 = −1.26746e−007 A10 = 7.76461e−010
2nd Surface K = 0.00000e+000 A4 = −4.77965e−004 A6 = 1.90614e−006
A8 = 5.66789e−008 A10 = −4.59701e−009
6th Surface K = 0.00000e+000 A4 = −2.98216e−004 A6 = −4.10038e−006
A8 = −5.92404e−008
7th Surface K = 0.00000e+000 A4 = −4.58162e−004 A6 = 7.11715e−006
A8 = −3.73866e−009

-continued

Unit: mm

11th Surface

K = 0.00000e+000 A4 = −5.15595e−004 A6 = 4.42038e−006
A8 = 1.67647e−006

Data on Zoom Lens Units

| Unit | Start Surface | Focal Length |
|---|---|---|
| 1 | 1 | −12.35 |
| 2 | 6 | 12.23 |
| 3 | 14 | 29.33 |
| 4 | 16 | −80.97 |

Focusing unit: third lens unit
Imaging magnification: −0.5x

NUMERICAL EXAMPLE 3

(1) Focused on Object at Infinity

When focused on object at infinity, all values same as Numerical Example 1.

(2) Particular In-Focus State in Second Focusing Position Range in Telephoto End Position Unit: mm Data on Surfaces

| Surface No. | r | d | nd | vd |
|---|---|---|---|---|
| 1* | −126.177 | 0.85 | 1.85104 | 40.3 |
| 2* | 7.048 | 2.93 | | |
| 3 | 13.616 | 1.60 | 1.95906 | 17.5 |
| 4 | 26.806 | 1.21 | | |
| 5 (Stop) | ∞ | −0.10 | | |
| 6* | 6.790 | 2.67 | 1.76753 | 49.3 |
| 7* | 18.546 | 0.21 | | |
| 8 | 6.754 | 1.65 | 1.48749 | 70.2 |
| 9 | 13.961 | 0.51 | 1.85478 | 24.8 |
| 10 | 4.278 | 0.91 | | |
| 11* | 6.751 | 1.77 | 1.69350 | 53.2 |
| 12 | 33.956 | 1.46 | | |
| 13 | ∞ | 0.15 | | |
| 14 | 22.424 | 1.93 | 1.48749 | 70.2 |
| 15 | −38.354 | 34.23 | | |
| 16 | −6.592 | 0.60 | 1.48749 | 70.2 |
| 17 | −17.264 | 0.50 | | |
| 18 | −10.299 | 1.00 | 1.95906 | 17.5 |
| 19 | −9.796 | 3.51 | | |
| 20 | ∞ | 1.30 | 1.51633 | 64.1 |
| 21 | ∞ | 0.87 | | |
| Image Plane | ∞ | | | |

Data on Aspheric Surfaces

1st Surface

K = 0.00000e+000 A4 = −2.02625e−004 A6 = 7.87010e−006
A8 = −1.26746e−007 A10 = 7.76461e−010
2nd Surface K = 0.00000e+000 A4 = −4.77965e−004 A6 = 1.90614e−006
A8 = 5.66789e−008 A10 = −4.59701e−009
6th Surface K = 0.00000e+000 A4 = −2.98216e−004 A6 = −4.10038e−006
A8 = −5.92404e−008
7th Surface K = 0.00000e+000 A4 = −4.58162e−004 A6 = 7.11715e−006
A8 = −3.73866e−009

-continued

Unit: mm

11th Surface

K = 0.00000e+000 A4 = −5.15595e−004 A6 = 4.42038e−006
A8 = 1.67647e−006

Data on Zoom Lens Units

| Unit | Start Surface | Focal Length |
|---|---|---|
| 1 | 1 | −12.35 |
| 2 | 6 | 12.23 |
| 3 | 14 | 29.33 |
| 4 | 16 | −30.57 |

Focusing unit: first lens unit, second lens unit, and third lens unit
Imaging magnification: −2.1x

NUMERICAL EXAMPLE 4

(1) Focused on Object at Infinity

Unit: mm

Data on Surfaces

| Surface No. | r | d | nd | vd |
|---|---|---|---|---|
| 1* | −101.530 | 1.00 | 1.85135 | 40.1 |
| 2* | 11.563 | 2.59 | | |
| 3 | 17.158 | 1.68 | 2.00272 | 19.3 |
| 4 | 34.327 | (variable) | | |
| 5 (Stop) | ∞ | (variable) | | |
| 6* | 11.513 | 2.45 | 1.88202 | 37.2 |
| 7* | −158.863 | 0.20 | | |
| 8 | 12.241 | 2.10 | 1.88300 | 40.8 |
| 9 | −46.577 | 0.50 | 1.85478 | 24.8 |
| 10 | 6.040 | 2.24 | | |
| 11 | −17.396 | 0.50 | 1.80610 | 33.3 |
| 12 | 15.807 | 2.21 | 1.85135 | 40.1 |
| 13* | −13.421 | 0.37 | | |
| 14 | ∞ | (variable) | | |
| 15 | 44.289 | 3.17 | 1.59201 | 67.0 |
| 16* | −33.829 | (variable) | | |
| 17 | ∞ | 1.09 | 1.51633 | 64.1 |
| 18 | ∞ | 1.61 | | |
| Image Plane | ∞ | | | |

Data on Aspheric Surfaces

1st Surface

K = 0.00000e+000 A4 = −4.65961e−005 A6 = 8.04510e−007
A8 = −5.60379e−009 A10 = −1.81010e−011 A12 = 2.63709e−013
2nd Surface K = 1.32245e−001 A4 = −9.53359e−005 A6 = −4.31947e−007
A8 = 2.83384e−008 A10 = −6.45846e−010 A12 = 3.74432e−012
6th Surface K = 0.00000e+000 A4 = −1.14474e−004 A6 = −6.39836e−007
A8 = −4.86347e−009 A10 = −3.57225e−011
7th Surface K = 0.00000e+000 A4 = −5.86274e−006 A6 = 2.50952e−007
A8 = −3.51576e−009
13th Surface K = 0.00000e+000 A4 = −7.75182e−005 A6 = 1.40589e−007
A8 = −1.78341e−007
16th Surface K = 0.00000e+000 A4 = 2.07327e−005 A6 = −1.89462e−007
A8 = 8.61167e−010

-continued

Unit: mm

Other Data
Zoom Ratio 2.88

| | Wide-Angle | Middle | Telephoto |
|---|---|---|---|
| Focal Length | 10.40 | 15.85 | 30.00 |
| F-number | 2.06 | 3.75 | 4.90 |
| Half Viewing Angle | 32.34 | 26.49 | 14.75 |
| Image Height | 6.59 | 7.90 | 7.90 |
| Total Lens Length | 51.68 | 49.51 | 55.25 |
| BF | 7.45 | 6.18 | 5.03 |
| d 4 | 17.46 | 6.72 | 1.44 |
| d 5 | 0.00 | 2.63 | −0.18 |
| d14 | 7.77 | 14.97 | 29.95 |
| d16 | 5.12 | 3.85 | 2.70 |

Data on Zoom Lens Units

| Unit | Start Surface | Focal Length |
|---|---|---|
| 1 | 1 | −21.26 |
| 2 | 6 | 17.13 |
| 3 | 15 | 32.89 |

Focusing unit: third lens unit (2) Particular In-Focus State in Second Focusing Position Range in Telephoto End Position Unit: mm Data on Surfaces

| Surface No. | r | d | nd | vd |
|---|---|---|---|---|
| 1* | −101.530 | 1.00 | 1.85135 | 40.1 |
| 2* | 11.563 | 2.59 | | |
| 3 | 17.158 | 1.68 | 2.00272 | 19.3 |
| 4 | 34.327 | 5.44 | | |
| 5 (Stop) | ∞ | −0.18 | | |
| 6* | 11.513 | 2.45 | 1.88202 | 37.2 |
| 7* | −158.863 | 0.20 | | |
| 8 | 12.241 | 2.10 | 1.88300 | 40.8 |
| 9 | −46.577 | 0.50 | 1.85478 | 24.8 |
| 10 | 6.040 | 2.24 | | |
| 11 | −17.396 | 0.50 | 1.80610 | 33.3 |
| 12 | 15.807 | 2.21 | 1.85135 | 40.1 |
| 13* | −13.421 | 0.37 | | |
| 14 | ∞ | 5.68 | | |
| 15 | 44.289 | 3.17 | 1.59201 | 67.0 |
| 16* | −33.829 | 17.47 | | |
| 17* | −100.000 | 2.30 | 1.85135 | 40.1 |
| 18 | −16.402 | 0.40 | | |
| 19 | −26.776 | 1.20 | 1.69895 | 30.1 |
| 20 | 83.575 | 1.60 | | |
| 21 | ∞ | 1.09 | 1.51633 | 64.1 |
| 22 | ∞ | 1.61 | | |
| Image Plane | ∞ | | | |

Data on Aspheric Surfaces

1st Surface

K = 0.00000e+000 A4 = −4.65961e−005 A6 = 8.04510e−007
A8 = −5.60379e−009 A10 = −1.81010e−011 A12 = 2.63709e−013
2nd Surface K = 1.32245e−001 A4 = −9.53359e−005 A6 = −4.31947e−007
A8 = 2.83384e−008 A10 = −6.45846e−010 A12 = 3.74432e−012
6th Surface K = 0.00000e+000 A4 = −1.14474e−004 A6 = −6.39836e−007
A8 = −4.86347e−009 A10 = −3.57225e−011

17

-continued

Unit: mm

7th Surface

K = 0.00000e+000 A4 = −5.86274e−006 A6 = 2.50952e−007
A8 = −3.51576e−009

13th Surface

K = 0.00000e+000 A4 = −7.75182e−005 A6 = 1.40589e−007
A8 = −1.78341e−007

16th Surface

K = 0.00000e+000 A4 = 2.07327e−005 A6 = −1.89462e−007
A8 = 8.61167e−010

17th Surface

K = 0.00000e+000 A4 = −7.99946e−005 A6 = −3.84014e−007

Data on Zoom Lens Units

| Unit | Start Surface | Focal Length |
|------|---------------|--------------|
| 1    | 1             | −21.26       |
| 2    | 6             | 17.13        |
| 3    | 15            | 32.89        |
| 4    | 17            | 101.80       |

Focusing unit: second lens unit and third lens unit
Imaging magnification: −0.7x

NUMERICAL EXAMPLE 5

(1) Focused on Object at Infinity

Unit: mm

Data on Surfaces

| Surface No. | r | d | nd | vd |
|---|---|---|---|---|
| 1 | 17.262 | 0.65 | 1.84666 | 23.8 |
| 2 | 13.278 | 3.76 | 1.59201 | 67.0 |
| 3* | −154.322 | (variable) | | |
| 4* | −121.831 | 0.50 | 1.88202 | 37.2 |
| 5* | 5.695 | 2.47 | | |
| 6 | −31.357 | 0.30 | 1.77250 | 49.6 |
| 7 | 19.113 | 0.05 | | |
| 8 | 9.552 | 1.31 | 1.95906 | 17.5 |
| 9 | 29.113 | (variable) | | |
| 10 (Stop) | ∞ | −0.20 | | |
| 11* | 4.835 | 1.45 | 1.59201 | 67.0 |
| 12* | −13.140 | 0.10 | | |
| 13 | 3.868 | 1.24 | 1.58144 | 40.8 |
| 14 | 53.705 | 0.30 | 2.00100 | 29.1 |
| 15 | 3.101 | (variable) | | |
| 16 | 10.660 | 1.72 | 1.60311 | 60.6 |
| 17 | 92.498 | (variable) | | |
| 18 | ∞ | 0.80 | 1.51633 | 64.1 |
| 19 | ∞ | 0.99 | | |
| Image Plane | ∞ | | | |

Data on Aspheric Surfaces

3rd Surface

K = −2.06794e+002 A4 = 6.57153e−006 A6 = −6.93126e−009
A8 = 2.42994e−011

4th Surface

K = −3.19343e+003 A4 = −3.86449e−005 A6 = 3.74941e−007
A8 = −2.06972e−009

5th Surface

K = −2.98780e−002 A4 = 2.58045e−004 A6 = 1.93724e−006
A8 = 1.60099e−007

18

-continued

Unit: mm

11th Surface

K = −3.89688e−001 A4 = −4.72376e−004 A6 = −2.12855e−006

12th Surface

K = −6.13957e+000 A4 = 7.76455e−005

Other Data
Zoom Ratio 11.40

|  | Wide-Angle | Middle | Telephoto |
|---|---|---|---|
| Focal Length | 4.62 | 24.52 | 52.64 |
| F-number | 3.67 | 5.41 | 7.19 |
| Half Viewing Angle | 34.22 | 8.98 | 4.21 |
| Image Height | 3.14 | 3.88 | 3.88 |
| Total Lens Length | 38.46 | 44.54 | 51.71 |
| BF | 4.14 | 9.17 | 4.73 |
| d 3 | 0.34 | 11.69 | 15.20 |
| d 9 | 15.38 | 2.97 | 0.56 |
| d15 | 4.94 | 7.06 | 17.58 |
| d17 | 2.63 | 7.66 | 3.22 |

Data on Zoom Lens Units

| Unit | Start Surface | Focal Length |
|------|---------------|--------------|
| 1    | 1             | 29.68        |
| 2    | 4             | −6.26        |
| 3    | 10            | 9.45         |
| 4    | 16            | 19.82        |

Focusing unit: fourth lens unit

(2) Particular In-Focus State in Second Focusing Position Range in Telephoto End Position Unit: mm

Data on Surfaces

| Surface No. | r | d | nd | vd |
|---|---|---|---|---|
| 1 | 17.262 | 0.65 | 1.84666 | 23.8 |
| 2 | 13.278 | 3.76 | 1.59201 | 67.0 |
| 3* | −154.322 | 15.20 | | |
| 4* | −121.831 | 0.50 | 1.88202 | 37.2 |
| 5* | 5.695 | 2.47 | | |
| 6 | −31.357 | 0.30 | 1.77250 | 49.6 |
| 7 | 19.113 | 0.05 | | |
| 8 | 9.552 | 1.31 | 1.95906 | 17.5 |
| 9 | 29.113 | 3.56 | | |
| 10 (Stop) | ∞ | −0.20 | | |
| 11* | 4.835 | 1.45 | 1.59201 | 67.0 |
| 12* | −13.140 | 0.10 | | |
| 13 | 3.868 | 1.24 | 1.58144 | 40.8 |
| 14 | 53.705 | 0.30 | 2.00100 | 29.1 |
| 15 | 3.101 | 1.44 | | |
| 16 | 10.660 | 1.72 | 1.60311 | 60.6 |
| 17 | 92.498 | 13.13 | | |
| 18 | −5.625 | 0.50 | 1.60311 | 60.6 |
| 19 | −17.001 | 1.23 | 1.69895 | 30.1 |
| 20 | −7.134 | 1.50 | | |
| 21 | ∞ | 0.80 | 1.51633 | 64.1 |
| 22 | ∞ | 0.99 | | |
| Image Plane | ∞ | | | |

Data on Aspheric Surfaces

3rd Surface

K = −2.06794e+002 A4 = 6.57153e−006 A6 = −6.93126e−009
A8 = 2.42994e−011

-continued

Unit: mm

4th Surface

K = −3.19343e+003 A4 = −3.86449e−005 A6 = 3.74941e−007
A8 = −2.06972e−009

5th Surface

K = −2.98780e−002 A4 = 2.58045e−004 A6 = 1.93724e−006
A8 = 1.60099e−007

11th Surface

K = −3.89688e−001 A4 = −4.72376e−004 A6 = −2.12855e−006

12th Surface

K = −6.13957e+000 A4 = 7.76455e−005

Data on Zoom Lens Units

| Unit | Start Surface | Focal Length |
|---|---|---|
| 1 | 1 | 29.68 |
| 2 | 4 | −6.26 |
| 3 | 10 | 9.45 |
| 4 | 16 | 19.82 |
| 5 | 18 | −267.09 |

Focusing unit: third lens unit and fourth lens unit
Imaging magnification: −0.4x

TABLE 1

| | Condition (1) | Condition (2) | Condition (3) | Condition (4) | Condition (5) | Condition (6) | Condition (7) |
|---|---|---|---|---|---|---|---|
| Example 1 | 0.009 | 0.088 | 1.000 | 0.0337 | −6.84 | 1.083 | 1.000 |
| Example 2 | 0.007 | 0.066 | 0.500 | 0.0119 | −6.82 | 1.069 | 1.000 |
| Example 3 | 0.069 | 0.124 | 2.100 | 0.0354 | −9.00 | 1.069 | 0.851 |
| Example 4 | 0.038 | 0.142 | 0.700 | 0.0706 | −0.55 | 1.069 | 1.000 |
| Example 5 | 0.006 | 0.092 | 0.400 | 0.0335 | −9.19 | 1.127 | 1.000 |

One exemplary embodiment of a digital camera (image pickup apparatus) using an optical system according to the exemplary embodiments will next be described with reference to FIG. 17. FIG. 17 illustrates a digital camera body 20 as including a image-capturing optical system 21, a solid-state image sensor (photoelectric conversion element) 22, a recorder 23, and a finder 24. The image-capturing optical system 21 includes any one of the optical systems of the first to fifth embodiments. The image sensor 22 is, for example, a CCD sensor or a CMOS sensor, incorporated in the camera body 20, and receives an object image formed by the image-capturing optical system 21. The recorder 23 records the object image received by the image sensor 22. The finder 24 is used to observe an object image displayed on a display device (not illustrated).

Application of an optical system according to an exemplary embodiment of the present invention to an image pickup apparatus, such as a digital camera, provides an image pickup apparatus having both an increased imaging magnification and high optical performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-220758, filed Nov. 10, 2015, which is hereby incorporated by reference herein in its entirety.

What is claimed is:

1. An optical system comprising:
an aperture stop;
an optical member; and
a driving unit configured to drive the optical member,
wherein the driving unit is configured to drive the optical member so that the optical member is arranged outside the optical path when the optical system focuses on a first focus range between infinity and a first finite distance, and
wherein the driving unit is configured to drive the optical member so that the optical member is arranged on the optical path on an image side of the aperture stop when the optical system focuses on a second focus range between a second finite distance shorter than the first finite distance and a third finite distance shorter than the second finite distance,
wherein the optical system satisfies a following condition:

$|dA/fA|<0.10$ where dA is a thickness of the optical member on the optical axis, and fA is a focal length of the optical member, and
wherein the second focus range covers an in-focus state that satisfies a following condition:

$0.01<KA/LTK<0.19$, and $0.85<|\beta A|<1.25$ where LTK is a total length of the optical system, KA is a distance on the optical axis from a lens surface vertex closest to the object side of the optical member to an image plane, and $\beta A$ is a lateral magnification of the optical member.

2. The optical system according to claim 1, further comprising a focusing lens unit configured to move during a focusing operation and arranged on the image side of the aperture stop.

3. The optical system according to claim 1, wherein the optical member consists of two lenses or less.

4. The optical system according to claim 1, wherein the second focus range covers an in-focus state that satisfies a following condition:

$0.30<|\beta K|<2.70$ where $\beta K$ is an imaging magnification of the optical system.

5. The optical system according to claim 1, wherein, in the second focus range, the optical member does not move during a focusing operation in the second focus range.

6. The optical system according to claim 1, wherein the second focus range covers an in-focus state that satisfies a following condition:

$0.005<dA/LTK<0.100$.

7. The optical system according to claim 1,
wherein a lens surface closest to the object side of the optical member is concave, and wherein the second focus range covers an in-focus state that satisfies a following condition:

$$-15.0 < LTK/rA < -0.1$$

where rA is a curvature radius of the lens surface closest to the object side of the optical member.

8. The optical system according to claim 1, wherein the second focus range covers an in-focus state that satisfies a following condition:

$$0.75 < LT/LTK < 1.20$$

where LT is a total length of the optical system focused at infinity.

9. An image pickup apparatus comprising:
an optical system; and
an image pickup element configured to receive an image formed by the optical system,
wherein the optical system includes:
an aperture stop,
an optical member, and
a driving unit configured to drive the optical member,
wherein the driving unit is configured to drive the optical member so that the optical member is arranged outside the optical path when the optical system focuses on a first focus range between infinity and a first finite distance, and
wherein the driving unit is configured to drive the optical member so that the optical member is arranged on the optical path on an image side of the aperture stop when the optical system focuses on a second focus range between a second finite distance shorter than the first finite distance and a third finite distance shorter than the second finite distance,
wherein the optical system satisfies a following condition:

$$|dA/fA| < 0.10$$

where dA is a thickness of the optical member on the optical axis, and fA is a focal length of the optical member, and
wherein the second focus range covers an in-focus state that satisfies a following condition:

$$0.01 < KA/LTK < 0.19, \text{ and}$$

$$0.85 < |\beta A| < 1.25$$

where LTK is a total length of the optical system, KA is a distance on the optical axis from a lens surface vertex closest to the object side of the optical member to an image plane, and βA is a lateral magnification of the optical member.

10. The optical system according to claim 2, wherein the focusing lens unit is moved toward an object side during focusing from infinity to a near distance.

* * * * *